(12) United States Patent
Miura

(10) Patent No.: US 8,964,238 B2
(45) Date of Patent: Feb. 24, 2015

(54) RECORDING METHOD AND RECORDING APPARATUS

(75) Inventor: Hirotsuna Miura, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 89 days.

(21) Appl. No.: 13/356,850

(22) Filed: Jan. 24, 2012

(65) Prior Publication Data

US 2012/0188564 A1 Jul. 26, 2012

(30) Foreign Application Priority Data

Jan. 24, 2011 (JP) ................................ 2011-012272

(51) Int. Cl.
- *G06K 15/10* (2006.01)
- *G06K 15/16* (2006.01)
- *H04N 1/191* (2006.01)
- *H04N 1/40* (2006.01)

(52) U.S. Cl.
CPC .............. *G06K 15/105* (2013.01); *G06K 15/10* (2013.01); *G06K 15/16* (2013.01); *H04N 1/1915* (2013.01); *H04N 1/1917* (2013.01); *H04N 1/40025* (2013.01)
USPC .......... 358/1.18; 358/1.8; 358/3.26; 358/1.12

(58) Field of Classification Search
USPC .......................................................... 358/1.8
See application file for complete search history.

(56) References Cited

U.S. PATENT DOCUMENTS

| | | | |
|---|---|---|---|
| 5,813,776 A | 9/1998 | Fujiwara et al. | |
| 7,311,379 B2 * | 12/2007 | Mitsuzawa | 347/40 |
| 7,533,961 B2 * | 5/2009 | Kikuchi et al. | 347/41 |
| 7,665,818 B2 * | 2/2010 | Yoshida | 347/16 |
| 2005/0260021 A1 | 11/2005 | Abello | |
| 2006/0120787 A1 | 6/2006 | Abello | |
| 2010/0149252 A1 | 6/2010 | Yoshihisa | |

FOREIGN PATENT DOCUMENTS

| | | |
|---|---|---|
| CN | 1183350 | 6/1998 |
| CN | 1663233 | 8/2005 |
| JP | 2001-301248 | 10/2001 |
| JP | 2004-025551 | 1/2004 |
| JP | 2010-142981 | 7/2010 |
| JP | 2010-181999 | 8/2010 |

\* cited by examiner

*Primary Examiner* — King Poon
*Assistant Examiner* — Marchelle L Taggart
(74) *Attorney, Agent, or Firm* — Workman Nydegger

(57) ABSTRACT

P recording heads are arranged a recording unit. The P recording heads are divided into N (groups in the sub-scanning direction. The N controllers respectively control the recording heads pertaining to corresponding groups. When it is determined that variable data straddles a boundary (M/S boundary line) of recording regions (a master recording region and a slave recording region) of the recording heads, which are controlled by different controllers, the feed quantity of the recording unit is adjusted to a feeding quantity such that the variable data do not straddle the M/S boundary line.

9 Claims, 10 Drawing Sheets

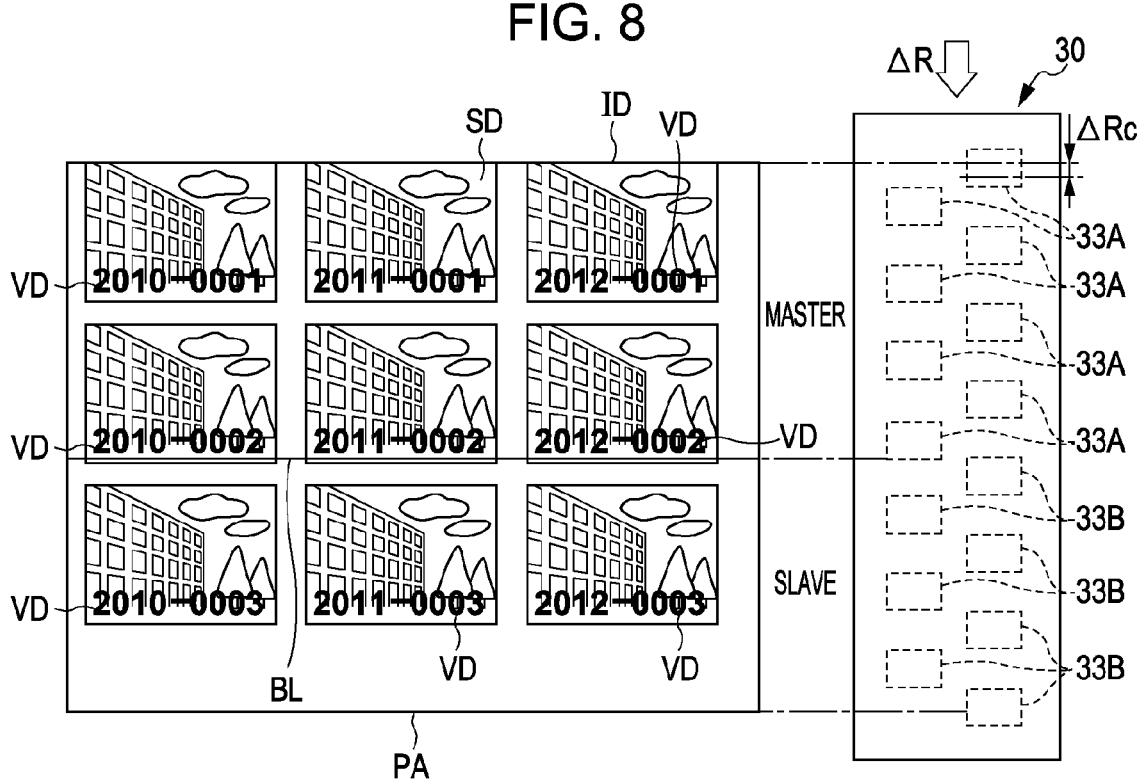
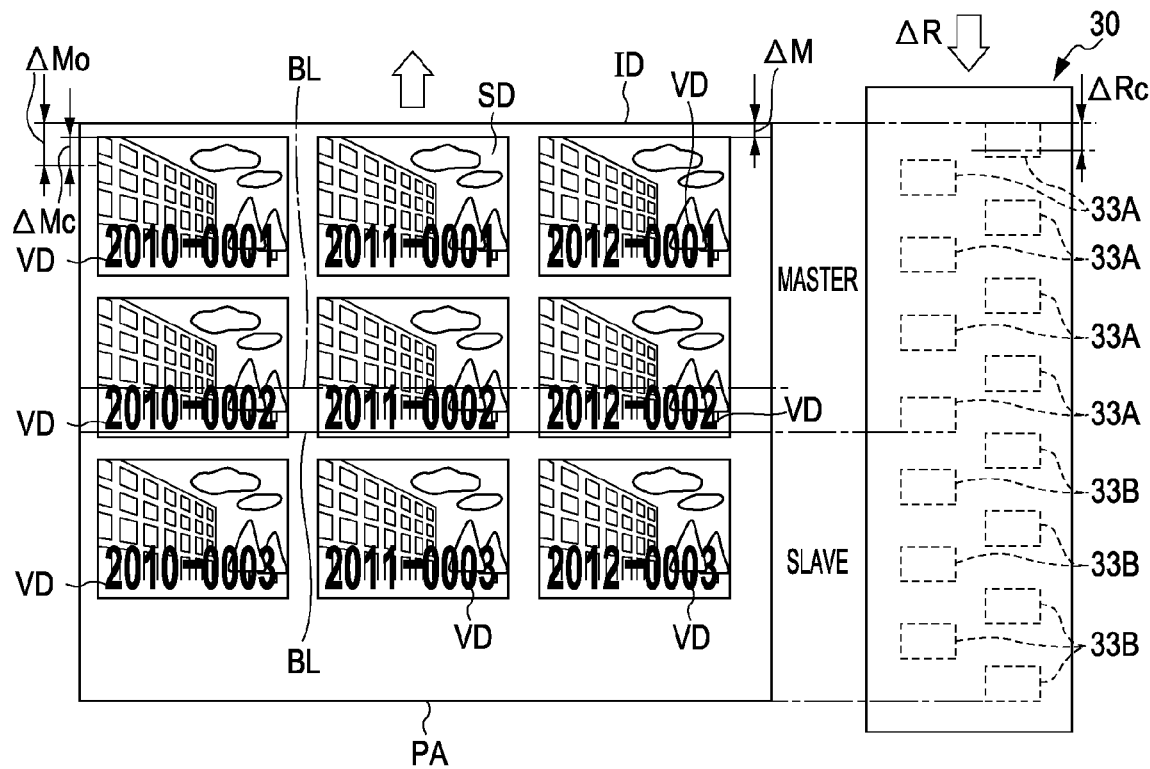

RECORDING METHOD AND RECORDING APPARATUS

This application claims priority to Japanese Application No. 2011-012272 filed Jan. 24, 2011, which application is incorporated by reference in its entirety.

BACKGROUND

1. Technical Field

Embodiments of the present invention relate to a recording apparatus and a recording method that perform recording on a recording medium by performing scanning of a recording unit and insertion of linefeeds that relatively move the recording unit and the recording medium in the direction crossing the scanning direction, such as a lateral recording method and a serial recording method.

2. Related Art

For example, a printing apparatus (recording apparatus), such as a serial-type printer and a lateral scan-type printer, prints a document or an image by ejecting ink droplets from the nozzle of a recording head disposed on a carriage during each movement or pass of the carriage in the main scanning direction.

For example, printing apparatuses including a recording unit equipped with a plurality of recording heads (printing heads) are disclosed in JP-A-2004-25551 and JP-A-2010-142981. The recording heads are arranged in two lines or four lines, for example, in a zigzag pattern, in the recording unit. In the printing apparatus described in JP-A-2004-25551, a plurality of printing heads and driving control units corresponding to one or more of a predetermined number of printing heads are mounted on a carriage. A plurality of data processing units that transmit data to the driving control units, respectively, are mounted on the main body of the printing apparatus. A predetermined number of printing heads, one driving control unit, and one data processing unit are connected to a main control unit. The main control unit performs main control for reciprocating the carriage. In the printing apparatus, a plurality of circuit sets each of which is composed of one driving control unit and one data processing unit for a predetermined number of printing heads is provided, such that the process load per data processing unit is small.

Further, for example, printing apparatuses that print a composite image implemented by fixing data of a fixing image (common image) which is the same each time and variable data of a variable image which changes each time are disclosed in JP-A-2001-301248 and JP-A-2010-181999.

For example, as the number of recording heads increases, it may be possible to consider a configuration provided with two or more main control units themselves and divisionally controlling a plurality of recording heads with the two or more main control units (control units). In this case, the main control units are necessary to be synchronized when controlling the corresponding recording heads, respectively. For example, in the case with two main control units, one of them is a master (master side controller) and the other is a slave (slave side controller) and printing is controlled at the time when all the controllers are prepared to start while the master side controller communicates with the slave side controller to be synchronized.

FIG. 13 shows an example of a printer divisionally controlling a plurality of recording heads mounted on the type of recording unit, with two controllers (control units). As shown in FIG. 13, the printer includes two controllers C1 and C2 divisionally controlling a plurality of recording heads 201A and 201B mounted on a recording unit 200, for example. The recording heads 201A and 201B are arranged in two lines at two different positions in a main scanning direction X (left-right direction in the figure) in a zigzag pattern. Since the recording head in the two lines have different ink ejection timing, it is preferable that the master side controller C1 control the recording heads 201A in the right line which have the same ejection timing and the slave side controller C2 control the recording heads 201B in the left line which have the same ejection timing.

The data for printing a plurality of frame images shown in FIG. 13 is common fixed data SD and variable data VD with variable values, such as numbers or symbols, which are provided for the frames, respectively. The printing when a part of an image is variable data, as described above, is particularly called partial variable printing. It is preferable, in the partial variable printing, to share the fixed data SD, and for example, combine the variable data VD changing for each frame into the fixed data SD.

Meanwhile, as shown in FIG. 13, the recording regions (master recording regions) of the recording heads 201A controlled by the master side controller C1 and the recording regions (slave recording regions) of the recording heads 201B controlled by the slave side controller C2 are alternately arranged of one recording head each in the sub-scanning direction Y. Therefore, several boundary lines are shown in each recording head. For example, when the number of the recording heads is G, G−1 boundary lines L are shown for the length of each nozzle line of one recording head in the sub-scanning direction Y. There was a problem in that as the number of boundary lines L increases, as described above, the frequency of the variable data straddling the boundary lines L increases.

When the variable data VD straddles the boundary line L of the master recording region and the slave recording region and the recording control timings of the recording heads 201A and 201B are slightly different between the controllers C1 and C2, a variable image may be printed out of alignment at both sides of the boundary line L. In particular, since the variable image is necessary to be clearly printed, such as a number, a symbol, or a code image (barcode or two-dimensional code), it is difficult to read out the variable image, such as a number, a symbol, or a code image, when the variable image is printed out of alignment at both sides of the boundary line. There is a problem in that the small print misalignment may cause misreading, when reading the variable image on the basis of the result of taking the variable image with a camera or the like.

On the other hand, it is necessary to make the controllers C1 and C2 perform complicated processes or complicate control, or to perform communication of exchanging information for the complicated processes or control between the controllers C1 and C2 or communication for synchronization between the controllers C1 and C2, in order to prevent the print misalignment in the variable image. In this case, the controllers C1 and C2 are provided with extra processes or additional control or high frequency of communication between the controllers C1 and C2. As a result, there may be a problem in that an increase in processing load of the controllers C1 and C2 is caused by them or print throughput is correspondingly decreased.

In detail, when the controllers C1 and C2 generate variable data and the variable data straddles the master and the slave, and when the result of process pass analysis and error diffusion data of the joint is not exchanged, the joint may be shown after printing. That is, the error diffusion process uses the previous (for example, upper or left) data processing result, such that when the slave processes the head of a gap without checking the last process result of the master, matching with the last data of the master is not performed and a line may be shown at the joint after printing. When image process data is exchanged each time between the controllers C1 and C2 of the master and the slave in order to prevent this problem, printing is made very slow because the communication (for example, serial communication) between the controllers C1 and C2 is low.

SUMMARY

Embodiments of the invention advantageously provide a recording apparatus and a recording method that can reduce the frequency of divisionally recording a variable image by a plurality of recorders, which are controlled by different control units, based on variable data.

According to an aspect of the invention, a lateral scanning type recording apparatus is provided, although other types of recording apparatus can be included in embodiments of the invention. The recording apparatus includes: a recording unit that includes P (P is a natural number of 2 or more) recorders that perform recording on a recording medium; a transporting unit that transports the recording medium; a scanning unit that allows the recording unit to scan in a first direction in order to perform the recording of the recorder (e.g., eject a liquid or fluid) on the recording medium; a feeding unit that feed the recording medium in a second direction crossing the first direction; a data acquiring unit that acquires fixed data and variable data; and a control unit that includes N (N is a natural number of P or less) controllers divisionally controlling (each of the N controllers control at least one of the P recorders) the P recorders and controls a feeding quantity in the linefeed insertion of the feeding unit such that a variable image based on the variable data does not straddle a boundary of recording regions in the second direction crossing the first direction between the recorders controlled by the different controllers.

According to the aspect of the invention, the feeding quantity in linefeed insertion when recording based on fixed data and variable data is performed is controlled such that a recording image based on the variable data does not straddle a boundary of recording regions controlled by different control units. Therefore, it is possible to reduce a frequency where the recorders controlled by different controllers divisionally record a variable image based on the variable data. For example, it is possible to reduce a frequency of generation of recording deviation in a variable image, due to straddling of the variable image based on the variable data on the boundary. In other words, by ensuring that the boundary between recording regions does not occur with respect to the variable image based on the variable data, it is possible to reduce the frequency with which deviations in the variable image occur.

Further, for example, it is possible to reduce a frequency of performing a remaining process or control, even if the remaining process or control for suppressing the recording deviation in the variable image. Accordingly, it is possible to reduce the recording deviation in the variable image without substantially increasing the load in the control unit. Further, since the feeding quantity is controlled, it is possible to record an image based on fixed data and variable data onto a recording medium, without deviation in the recording position, for example, in the variable image.

In the recording apparatus, the recording medium may perform M-time (M is a natural number of 2 or more) scannings and recordings of one-time lateral scanning by inserting M−1-time linefeed. At least the feeding quantity may be adjusted when the variable image straddles the boundary, when a linefeed having a specified feeding quantity is inserted among the M−1-time linefeed insertions. Adjusting the feeding quantity can adjust the boundary such that the boundary does not occur with respect to the variable image.

According to the aspect of the invention, at least the feeding quantity is adjusted, when the variable image straddles the boundary in the M−1-time linefeed insertion. Since the adjustment may be performed, if necessary, it is possible to reduce the load in processing performed by the control unit.

In the recording apparatus, the N controllers may control one or more recorders pertaining to a group corresponding to the P recorders which are divided into N groups in the second direction crossing the first direction, respectively.

According to the aspect of the invention, since the number of recorders is larger than the number of control units (N<P), P recorders are divided into N (N is a natural number under P) groups in the second direction, and the recorders pertaining to the N groups are controlled by the control units corresponding to the groups, it is possible to increase the frequency of controlling the variable image based on the variable data so that the variable data does not straddle the boundary because it is possible to make the number of boundaries smaller than a recording apparatus including the same number (N=P) of controllers and recorders.

In the recording apparatus, the control unit may include a first determining unit that determines whether the variable image straddles the boundary and a second determining unit that determines whether the feeding quantity that prevents the variable image from straddling the boundary is adjustable when the first determining unit determines that the variable image straddles the boundary, and the control unit may perform adjustment of the feeding quantity when the second determining unit determines that the adjustment is possible, and may perform an image process, which deviates a recording position of an image based on the fixed data and the variable data in the second direction to a position where the variable image based on the variable data does not straddle the boundary, on the fixed data and the variable data when the second determining unit determines that the adjustment is not possible.

According to the aspect of the invention, the image process that moves back the recording position of an image based on the fixed data and the variable data to a position where the variable image based on the variable data does not straddle the boundary is applied to the fixed data and the variable data, even if it is difficult to deal with a defect by adjusting the feeding quantity. As a result, it is possible to perform recording such that the variable image data based on the variable data does not straddle the boundary.

In the recording apparatus, the control unit may adjust the feeding quantity and perform the image process on the fixed data and the variable data, when the second determining unit determines that the feeding quantity is not adjustable.

According to the aspect of the invention, since the adjustment of a feeding quantity and the image process applied to the fixed data and the variable data are performed when it is difficult to deal with a defect only by adjusting the feeding quantity, it is possible to make deviation of the recording position of an image based on the fixed data and the variable data smaller than when only the image process is performed while it is possible to increase frequency of controlling the variable image based on the variable data so that the variable data does not straddle the boundary.

In the recording apparatus, the control unit may include: a first determining unit that determines whether the variable image straddles the boundary; a calculating unit that calculates a feeding quantity that is adjustable such that a variable image based on the variable data does not straddle the boundary when it is determined that the boundary is straddled; a first adjusting unit that performs adjustment according to the adjust amount of the feeding quantity on the fixed data; a second adjusting unit that performs adjustment according to the adjustment amount of the feeding quantity on the variable data; and a combining unit that combines the fixed data after the adjustment with the variable data after the adjustment, and the control unit may control the feeding unit to insert a linefeed with the feeding quantity calculated by the calculating unit.

According to the aspect of the invention, when the first determining unit determines that the variable image based on the variable data straddles the boundary, the calculating unit calculates a feeding quantity that can be adjusted such that the variable data does not straddle the boundary. Further, adjustment according to the adjustment amount of the feeding quantity is applied to the fixed data by the first determining unit and adjustment according to the adjustment amount of the feeding quantity is applied to the variable data by the second determining unit. The fixed data after the adjustment and the variable data after the adjustment are combined by the combining unit. As described above, when the fixed data and the variable data are combined in the recording apparatus, a remaining process for connecting both sides of the boundary of the variable image data is necessary when the variable data straddles the boundary, but it is possible to reduce the occurrence of this problem by using the remaining process. Accordingly, it is possible to reduce the load in processing of the controller.

In the recording apparatus, the first adjusting unit may further include a storing unit that stores fixed data after the adjustment which is adjusted for a first recording, in recording after a second recording, the second adjusting unit may perform adjustment according to the adjustment amount of the feeding quantity on variable data acquired by the data acquiring unit for recording after the second recording, and the combining unit may combine fixed data after the adjustment which is stored in the storing unit with variable data after adjustment by the second adjusting unit.

According to the aspect of the invention, the fixed data after the adjustment which is adjusted for the first recording is stored for the recording after the second recording. Further, in the recording after the second recording, the fixed data after the adjustment which is stored and the variable data after the adjustment where adjustment according to the adjustment amount of the feeding quantity of the variable data acquired for the recording after the second recording are combined. Therefore, it is preferable to perform adjustment according to the adjustment amount of the feeding quantity by acquiring only the variable data, using the fixed data after the adjustment, such that it is possible to reduce the load in processing of the controller.

In the recording apparatus, the recording apparatus may be a recording system including a printer driver disposed in a host device and a printer that communicates with the host device, the variable data may be code data, the printer driver may include the data acquiring unit, the determining unit, the calculating unit, and the first adjusting unit, and the printer may include a receiving unit that receives the variable data before adjustment and fixed data after the adjustment from the host device, a converting unit that converts the variable data from code data into image data, a second adjusting unit that performs adjustment according to the adjustment amount of the feeding quantity on a variable data after being converted into image data, and the combining unit.

According to the aspect of the invention, in the printer driver, determination of the determining unit, calculation of the feeding quantity of the calculating unit, and adjustment according to the adjustment amount of the feeding quantity for the fixed data of the first adjusting unit are performed. Further, the printer receives the variable data before the adjustment and the fixed data after the adjustment from the host device. In the printer, conversion of the variable data into image data from code data, adjustment according to the adjustment amount of the feeding quantity for the variable data (image data) of the second adjusting unit, and combining of the fixed data after the adjustment with the variable data after the adjustment of the combining unit are performed.

According to another aspect of the invention, there is provides a recording method of a lateral scanning type including a recording unit that includes P (P is a natural number of 2 or more) recorders that perform recording on a recording medium, a transporting unit that transports the recording medium, a scanning unit that allows the recording unit to scan in a first direction in order to perform the recording of the recorder on the recording medium; a feeding unit that feed the recording medium in a second direction crossing the first direction, and a control unit that includes N (N is a natural number of P or less) controllers divisionally controlling the P recorders, in which the recording method includes: acquiring fixed data and variable data; determining whether variable image based on the variable data straddles a boundary of recording regions in the second direction between the recorders controlled by the different controllers; performing adjustment according to the adjustment amount of the feeding quantity on the fixed data and the variable data while adjusting the feeding quantity in the linefeed insertion by the feeding unit such that the variable image does not straddle the boundary when it is determined that the variable image straddles the boundary; moving the recording unit by the adjusted feeding quantity; and causing the N controllers to perform recording by controlling the P recorders on the basis of the fixed data after the adjustment and the variable data after the adjustment. According to the aspect of the invention, it is possible to achieve the same effects as embodiments of the invention relating to the recording apparatus.

BRIEF DESCRIPTION OF THE DRAWINGS

Embodiments of the invention will be described with reference to the accompanying drawings, wherein like numbers reference like elements.

FIG. 8 is an example of a schematic view when a feeding quantity is adjusted such that variable data does not straddle the M/S boundary line.

FIG. 9 is an example of a schematic view when a feeding quantity and an upper margin are adjusted such that variable data does not straddle the M/S boundary line.

DESCRIPTION OF EXEMPLARY EMBODIMENTS

Hereinafter, FIGS. 1-12 and the following description disclose one or more embodiments of the invention in an ink jet type printer using a lateral scan method.

Figure 1:
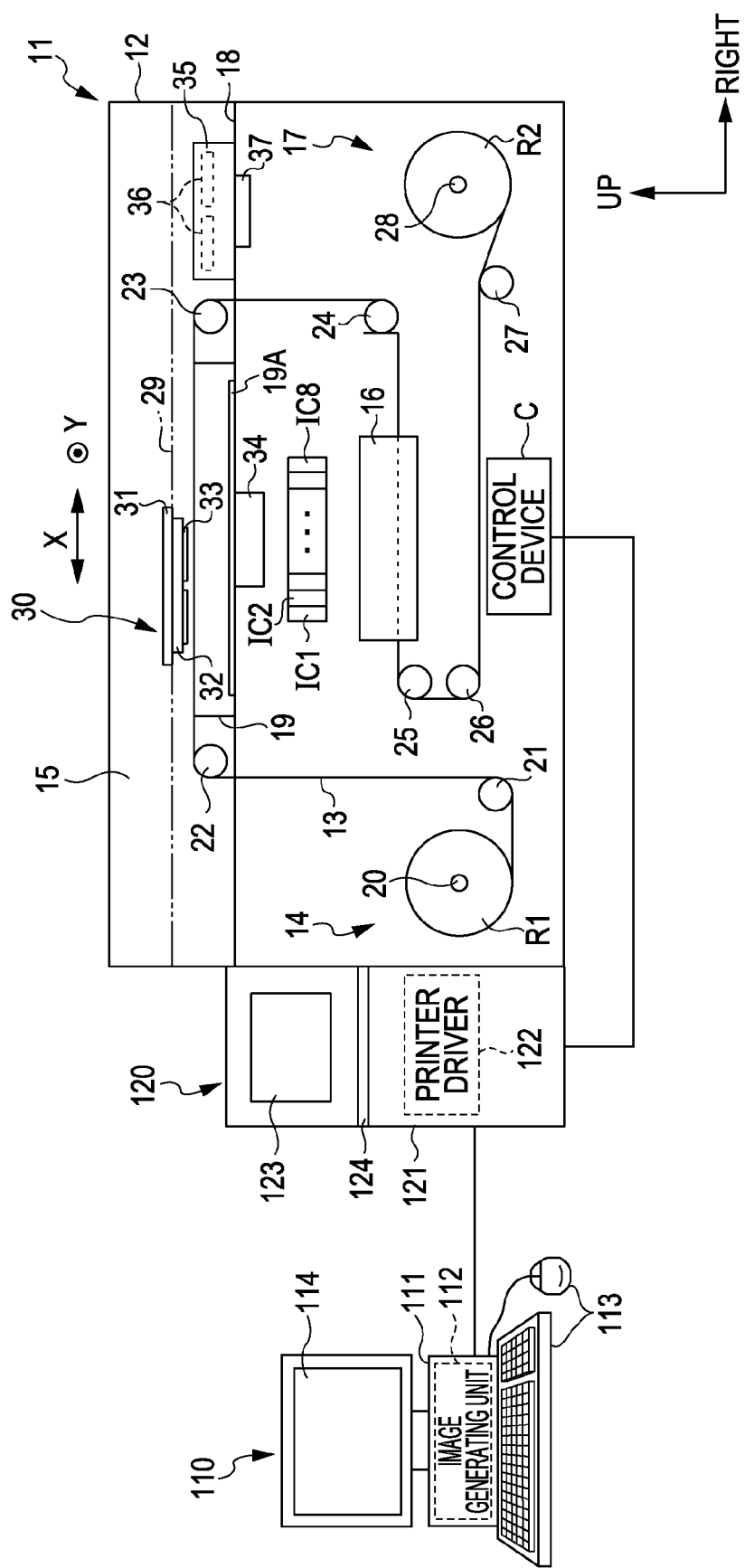
FIG. 1 is an illustrative schematic front view of a printing system according to an embodiment

As shown in FIG. 1, a printing system 100 includes an image generating device 110 that generates image data, a host device 120 that generates print data on the basis of the image data received from the image generating apparatus 110, and an ink jet type printer 11 (hereafter, simply referred to as a "printer 11"). The printer 11 uses a lateral scan method and is an example of a recording apparatus that prints an image on the basis of the print data received from the host device 120.

The image generating device 110 includes an image generating unit 112 that is implemented, for example, by a personal computer in which a CPU in a main body 111 executes programs for creating an image. A user starts the image generating unit 112 and operates an input device 113 to create an image for printing on a monitor 114.

For example, when a product is a label, a plurality of frame images with the images of a plurality of labels arranged in a matrix is generated. Further, when a predetermined operation is performed by the input device 113, image data relating to the image is transmitted to the host device 120 through a communication interface. The image data can be read into the host device 120 from the image generating device 110 by operating the host device 120.

The host device 120 includes a printer driver 122 that is implemented, for example, by a personal computer in which a CPU in a main body 121 executes programs for the printer driver. The printer driver 122 generates print data on the basis of image data and transmits the print data to a control device C disposed in the printer 11.

The control device C controls the printer 11 on the basis of the print data received from the printer driver 122 such that the printer 11 prints an image based on the image data. A menu screen, the image of a print object or the like may be displayed on a monitor 123. It is possible to input management information on the product (for example, a label) of a target object and various print conditions on a print set screen that is a lower-rank screen displayed by selection from the menu screen.

The management information may include a product number or lot number of the product and print surface information for designating whether it is front-side printing or rear-side printing in double-sided printing. Further, the print conditions may include the kind and size of print medium, print quality, and the number of sheets.

The kind of print medium can be selected from paper-like materials and film-like materials. For example, high-quality paper, cast paper, art paper, coated paper and the like are examples of the paper-like materials, while synthetic paper, PET, and PP are examples of the film-like material. The size of the print medium may also be selectable. For example, as the size of the print medium, a roll width or the like is set in the main printer 11 under the assumption of using a roll of which a long print medium is wound or other print medium configuration including sheets.

A variety of print modes determining print resolution or recording types can be set in the print quality and one of the print modes can be selected. Further, it may be possible to set the print resolution by changing the print modes. Further, the number of sheets (images) can be set in the number of sheets when several sheet printing is performed, which repeatedly prints a plurality of sheets (images) on the same area of a print medium. When a plurality of sheets is set, it is possible to display and designate the images of the sheets on the monitor 123.

Next, the configuration of the printer 11 shown in FIG. 1 is described. Further, in the following description, the "left-right direction" and the "up-down direction" is described with reference to the arrows in FIG. 1. Further, the front side is the front side and the back side is the rear side in FIG. 1.

As shown in FIG. 1, a discharging unit 14 that discharges a long sheet 13, an example of a recording medium, from a roll R1, a printing room 15 that performs printing by ejecting ink (liquid) onto the sheet 13, a drying device 16 (drying furnace) that performs a drying process to the sheet 13 with ink sticking by the printing or to the ink ejected onto the sheet 13, and a winding unit 17 that winds the sheet 13, which has undergone the drying process, into a roll R2, are disposed in a main body case 12 of the printer 11. The main body case 12 may be rectangular.

The region above a flat plate-shaped base 18 vertically dividing the inside of the main body case 12 is the printing room 15. A circular plate-shaped support base 19 supports a print area of the sheet 13 and is disposed and supported on the base 18 on the bottom center position of the printing room 15. Further, the discharging unit 14 is disposed close to the left side, which is the upstream side in the transport direction of the sheet 13 relative to the base 19. The winding unit 17 is disposed close to the right side in the printer 11 and is on the downstream side of the base 19, in the region under the base 18 in the main body case 12. Further, the drying device 16 is disposed at a slight upper position between the discharging unit 14 and the winding unit 17. Further, a heater 19A that heats the support base 19 to a predetermined temperature (for example, 40° C. to 60° C.) is disposed on the bottom of the support base 19, such that the printed portion of the sheet 13 is primarily dried on the support base 19. Further, the primarily dried sheet 13 is secondarily dried in the drying device 16.

As shown in FIG. 1, a winding shaft 20 is rotatably disposed in the discharging unit 14 and the roll R1 is integrally supported with respect to the winding shaft 20 in one example. Further, the sheet 13 is discharged from the roll R1 by rotation of the winding shaft 20. The sheet 13 discharged from the roll R1 is wound around a first roller 21, which is positioned at the right side of the winding shaft 20, and guided upward.

The sheet 13 with the transport direction changed to the vertical direction by the first roller 21 is wound on a second roller 22, which is disposed at the left side of the support base 19 to vertically correspond to the first roller 21, from the left lower portion. Further, the sheet 13 with the transport direction changed to the horizontal right side by being wound on the second roller 22 comes in contact with the upper surface of the support base 19.

Further, a third roller 23 opposite to the second roller 22 at the left side with the support base 19 therebetween is disposed at the right side of the support base 19. The positions of the second roller 22 and the third roller 23 are adjusted such that the tops of the circumferential surfaces of the first and second rollers are at the same height as the upper surface of the support base 19.

The sheet 13 transported downstream (right side) to the upper surface of the support base 19 is wound on the third roller 23 from the right upper portion and the transport direction is changed to be vertically downward. Then, the sheet 13 is horizontally guided between a fourth roller 24 and a fifth roller 25 which are disposed under the support base 19. The sheet 13 passes through the drying device 16 on the transport path between the rollers 24 and 25. Further, the sheet 13 that has undergone the drying process in the drying device 16 is guided to the fifth roller 25, a sixth roller 26, and a seventh roller 27 and transported close to the winding unit 17. The sheet 13 is then wound into the roll R2 by rotation of a winding shaft 28 by a driving force of a transporting motor 61 (see FIG. 3). Further, it may be possible to employ a configuration of finishing a punching process of a product portion in the printer 11 by disposing a punching machine (not shown) for punching the product portion (for example, a label) printed on the sheet 13 on the path of the sheet 13 between the drying device 16 and the winding unit 17.

As shown in FIG. 1, a pair of guide rails 29 (indicated by a two dot chain line in FIG. 1) which extends in the left-right direction is disposed at both sides in the front-rear direction of the support base 19 in the printing room 15. A recording unit 30, which is an example of a recording section, is guided by the pair or guide rails 29 to be able to reciprocate in the main scanning direction X (first direction). The recording unit 30 includes a rectangular carriage 31 and recording heads 33 that are an example of a plurality of recorders supported on the lower surface of the carriage 31 through a support plate 32. The carriage 31 is supported to be able to reciprocate in the main scanning direction X (left-right direction in FIG. 1) along both guide rails 29 by the operation of a first carriage motor 62 (see FIG. 3). Further, the carriage 31 can also move in the sub-scanning direction Y (front-rear direction perpendicular to the plane of the paper in FIG. 1) (second direction) along guide rails (not shown) by the operation of a second carriage motor 63 (see FIG. 3). Therefore, the recording unit 30 can move in two directions: the main scanning direction X and the sub-scanning direction Y. Further, in the embodiment, a scanning section is implemented by the guide rails 29, the first carriage motor 62 and the like and a linefeed inserting section is implemented by a second carriage motor 63 or the like.

The entire surface of a predetermined range of the upper surface of the support base 19 is a print region and the sheets 13 are intermittently transported in the print area unit corresponding to the print region. A suction device 34 is disposed under the support base 19. The suction device 34 is driven to apply a negative pressure to several suction holes (not shown) that are formed through the upper surface of the support base 19, such that the sheet 13 is suctioned to the upper surface of the support base 19 by the suction force due to the negative pressure. Further, printing is performed in the print area of the sheet 13 by alternately performing a main scanning operation during which ink is ejected from the recording heads 33 while moving the recording unit 30 in the main scanning direction X and the performing sub-scanning operations that move the recording unit 30 in the sub-scanning direction Y to the next main scan position. When printing in the print area is finished, the negative pressure applied by the suction device 34 is removed and the sheet 13 suctioned on the support base 19 is released. Thereafter, the sheet 13 is transported in the transport direction (right in FIG. 1), the print position of the sheet 13 is changed in the main scanning direction X, and the next print area is disposed on the support base 19.

Further, a maintenance device 35 that performs maintenance on or for the recording heads 33 during non-printing is disposed in a non-print area that is located, in this example, in the right end in the printing room 15 in FIG. 1. The recording heads 33 of the recording unit 30 which stand by at the home position during non-printing are capped by caps 36 lifted by the operation of an elevating device 37, such that an increase in viscosity of the ink in the nozzle is avoided. Further, at a predetermined maintenance time or after a predetermined time, a suction pump (not shown) of the maintenance device 35 that is capped is driven to generate a negative pressure inside the cap 36, such that the ink is forcibly discharged from the nozzles. In this manner, the nozzles are cleansed by removing viscous ink from the nozzles and/or bubbles in the ink.

As shown in FIG. 1, a plurality of (for example, eight) ink cartridges IC1 to IC8 storing different colors of ink are detachably mounted in the main body case 12. The eight ink cartridges IC1 to IC8 store, for example, at least black K, cyan C, magenta M, yellow Y, white W, and clear (transparent for overcoat), respectively. Obviously, the kinds (colors) of the ink can be appropriately set, such that it is possible to employ a configuration of black printing with black ink only or a configuration of predetermined three colors, other than the eight colors or two colors. Further, it may be possible to employ a configuration equipped with a cartridge storing a moisturizer for maintenance.

The ink cartridges IC1 to IC8 are connected to the recording heads 33 through ink supply channels (not shown). The recording heads 33 perform printing on the sheet 13 by ejecting the ink supplied from the ink cartridges IC1 to IC8. Therefore, color printing is possible in the printer 11 of the embodiment.

Figure 2:
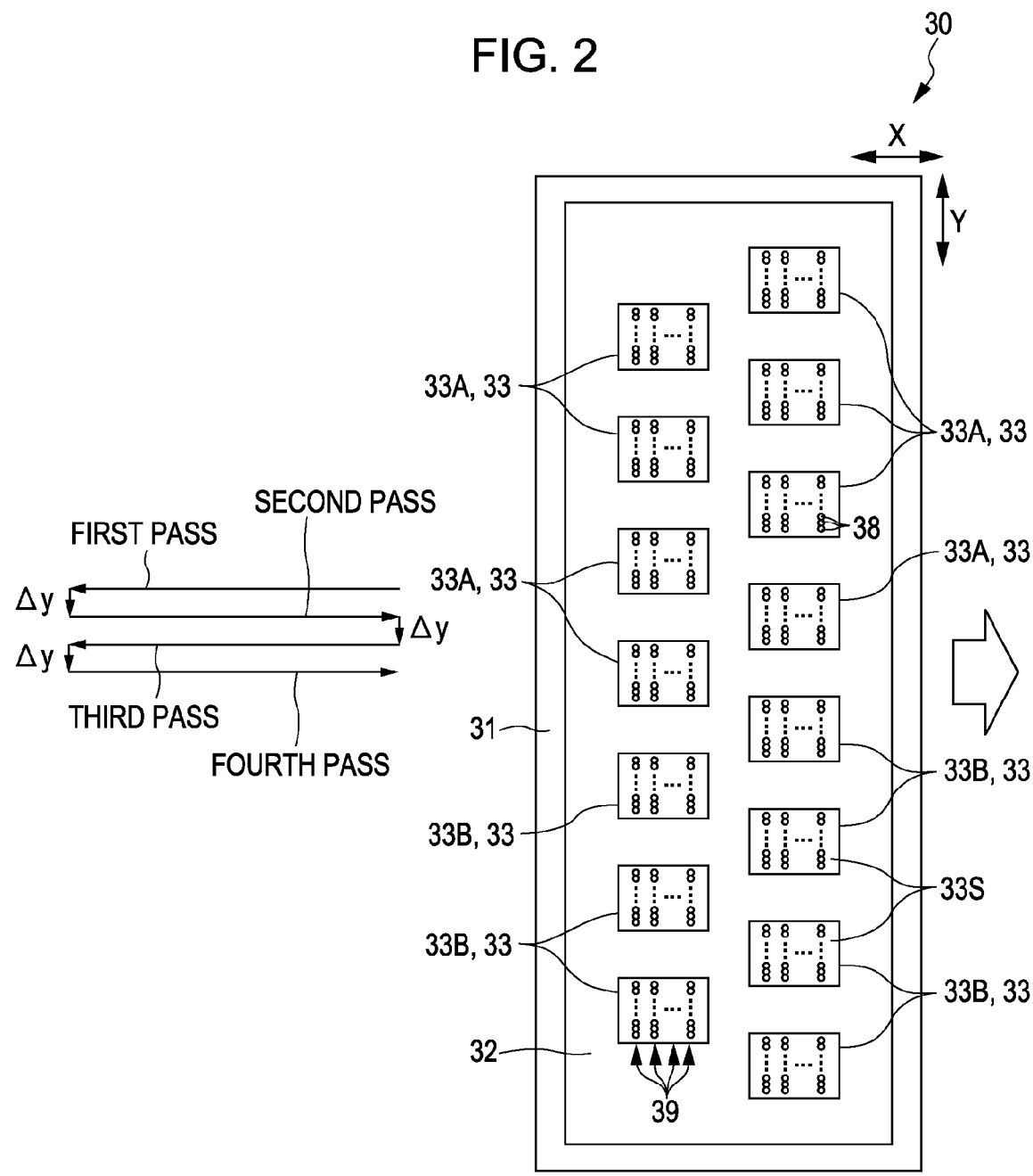
FIG. 2 is an illustrative schematic bottom view of a recording unit.

The configuration of the recording heads 33 disposed on the bottom of the recording unit 30 is described with reference to FIG. 2. As shown in FIG. 2, P (P is a natural number of 2 or more) (fifteen in the embodiment) recording heads 33 (33A and 33B) are supported in a zigzag arrangement pattern in the width direction (sub-scanning direction Y) perpendicular to the transport direction of the sheet 13 (the direction indicated by a white arrow in FIG. 2), on the support plate 32 supported on the bottom (front side in FIG. 2) of the carriage 31. That is, in the fifteen recording heads 33, the recording heads 33 are arranged with a predetermined pitch in the sub-scanning direction Y. Each of the recording heads 33 is configured to print a line and the fifteen recording heads 33 print fifteen lines. The recording heads 33 are arranged with a half-pitch gap between the lines in the sub-scanning direction Y.

Further, a plurality of nozzle lines 39 (eight lines in the embodiment), in which a plurality of (for example, one hundred eighty) nozzles 38 are arranged with a predetermined nozzle pitch in the sub-scanning direction Y, is formed, with a predetermined gap in the main scanning direction X, on the nozzle-forming surface 33S that is the bottom of each of the recording heads 33. Further, the plurality of (eight) nozzle lines 39 each receive ink from one ink cartridge corresponding to each of the eight ink cartridges IC1 to IC8 and eject different kinds of ink. In one example, each nozzle line ejects ink associated with one of the eight ink cartridges IC1 to IC8. As a result, each of the inks from the ink cartridges IC1 to IC8 can be ejected from each of the recording heads 33.

In the embodiment the P (fifteen in the embodiment) recording heads 33 are divided in two groups in the sub-scanning direction Y. That is, the plurality of recording heads 33 are divided into the eight recording heads 33A pertaining to the upstream group in the sub-scanning direction and the seven recording heads 33B pertaining to the downstream group in the sub-scanning direction. The eight recording heads 33A pertaining to one group and the seven recording heads 33B pertaining to the other group are controlled by controllers 41 and 42 (see FIG. 3), respectively, which are described below. The recording heads 33A and 33B can be grouped in various configurations.

One-time (one-frame) printing is performed by performing M main scannings according to the print resolution, by alternately moving the recording unit 30 in the main scanning direction X (main scanning) and in the sub-scanning direction Y (sub-scanning) (insertion of linefeed) in FIG. 2. The one-time main scanning in which the recording unit 30 is moved in the main scanning direction is called a "pass". There are four-pass printing and eight-pass printing in accordance with the print resolution in the embodiment. FIG. 2 shows an example of four-pass printing, in which the movement path of the recording unit 30 is indicated by an arrow. That is, in the four-pass printing, the first-pass printing is performed first by performing main scanning in which the recording unit 30 is moved in the main scanning direction X, and when the first-pass printing is finished, the recording unit 30 is disposed at the next main scan start position (next pass start position) by performing insertion of a linefeed (sub-scanning) that moves the recording unit 30 as much as a feeding quantity Δy (the amount of sub-scan transporting) in the sub-scanning direction Y. Next, the second-pass printing is performed from the position and the recording unit 30 is disposed at a third-pass main scan start position by performing insertion of a linefeed as much as the feeding quantity Δy after the second-pass printing. Thereafter, the third-pass and fourth-pass printing is performed by performing main scanning and insertion of a linefeed (sub-scanning) in the same way. The feeding quantity Δy is set to a half of the nozzle pitch in the fourth-pass printing and a quarter of the nozzle pitch of the eight-pass pitch. Therefore, in the eighth-pass printing, it is possible to achieve print resolution that is about double that of fourth-pass printing. The feeding quantity Δy may be set to a predetermined value according to the necessary print resolution. The feeding quantity Δy is a default value that is initially set and changed into different values, other than the feeding quantity Δy, if necessary, in the embodiment.

Next, the electrical configuration of the printing system 100 is described with reference to FIG. 3. A printer driver 122 in a host device 120 shown in FIG. 3 includes a host control unit 125 that controls display of various screens to display on a monitor 123, such as a menu screen and a print set screen, and performs predetermined processes according to operation signals input from an operating unit 124 on the display states of the screens. The host control unit 125 generally controls the printer driver 122.

Further, the printer driver 122 is equipped with an image processing unit 126 that performs a process for generating print data for image data received from a higher-rank image generating device 110. The image processing unit 126 applies image processes to the image data. For example, the image processes include, for example, a resolution change process, a color change process, a halftone process, and a microweave process. The printer driver 122 generates print job data (hereafter, simply referred to as "print data PD1 and PD2") by giving command written by print control codes (for example, ESC/P) to the print image data generated by applying the image processes.

The host device 120 includes a transmission control unit 127 that controls data transmission. The transmission control unit 127 serially transmits the print data PD1 and PD2 generated by the printer driver 122 in the unit of a packet data having a predetermined capacity to the printer 11 through serial communication ports U1 and U2. Further, the host control unit 125 can bi-directionally communicate with a control device C of the printer 11, such that the host control unit 125 transmits commands or control signals to the printer 11 through the transmission control unit 127 and receives responses from the printer 11.

Figure 3:
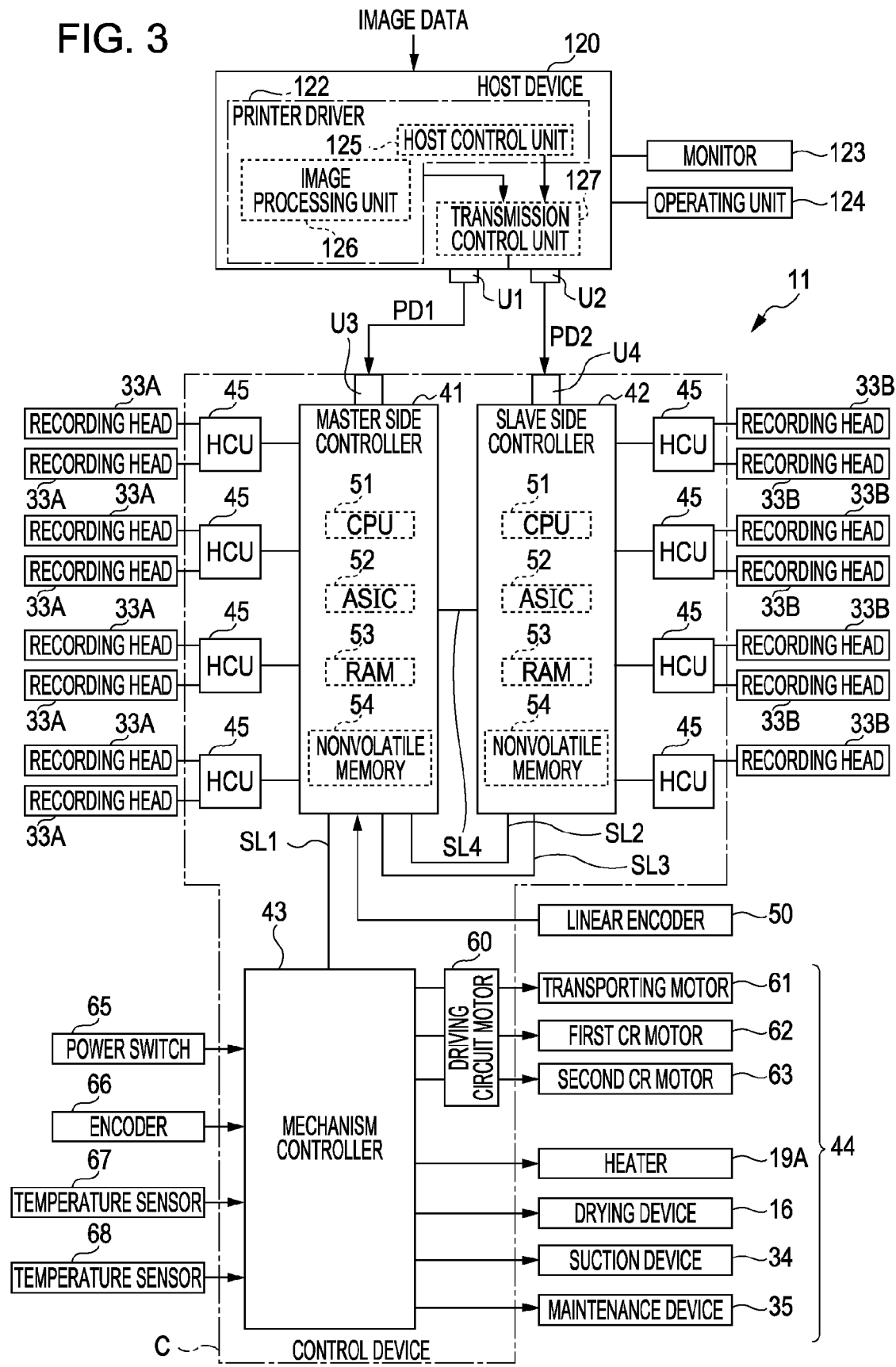
FIG. 3 is a block diagram showing an example of an electrical configuration of the printing system.

The control device C for the printer 11, shown in FIG. 3, includes N (N is a natural number of 2 or more or P or less) (two in the embodiment) controllers 41 and 42 that receive the print data PD from the host device 120 and that perform a variety of control, starting with control of a recording system. The N controllers 41 and 42 divisionally control N (two in the embodiment) groups of a predetermined number of (seven and eight in the embodiment) the P (fifteen in the embodiment) recording heads 33A and 33B. That is, in the embodiment when N is 2, a master side controller 41 controls eight recording heads 33A and the slave side controller 42 controls seven recording heads 33B. As shown in FIG. 3, a plurality of (eight in the embodiment) recording heads 33A are connected to the master side controller 41 through a plurality of (four in the embodiment) head control units 45 (hereafter, simply referred to as "HCUs 45"). Further, a plurality of (seven in the embodiment) recording heads 33B are connected to the slave side controller 42 through a plurality of (four in the embodiment) HCUs 45. Further, the two controllers 41 and 42 shown in FIG. 3 include serial communication ports U3 and U4 that are an example of receiving units that can communicate with the serial communication ports U1 and U2 for the host device 120.

The printer driver 122 in the host device 120 shown in FIG. 3 divides print image data into two in consideration of the positions of the recording heads 33A and 33B designated to the two controllers 41 and 42, respectively, and generates two print data PD1 and PD2 by giving the same command to the divided print image data. The transmission control unit 127 serially transmits the print data PD1 corresponding to the master side controller 41 through communication between the serial communication ports U1 and U3 and serially transmits the print data PD2 corresponding to the slave side controller 42 through communication between the serial communication ports U2 and U4.

The controllers 41 and 42 generate head control data, which the recording heads 33A and 33B can used, on the basis of the print image data in the print data PD1 and PD2, respectively, and transmit each data for one-time scanning (one pass) of the carriage 31 to the recording heads 33A and 33B through the HCUs 45.

As shown in FIG. 3, the control device C includes a mechanism controller 43 connected to the output side (the control downstream side) of the master side controller 41 through a communication line SL1. The controllers 41 and 42 acquire commands by analyzing the print data PD1 and PD2. The controllers 41 and 42 are connected to each other through a communication line SL3 and the slave side controller 42 outputs the acquired command to the master side controller 41 through the communication line SL3. The master side controller 41 outputs the acquired command to the mechanism controller 43, when the command acquired by analyzing the print data (or print command) corresponds with the command input through the communication line SL3 from the slave side controller 42. Therefore, the command can be output to the mechanism controller 43 when the controllers 41 and 42 are synchronized in controlling. Further, in the embodiment, an example of the control unit is implemented by the controllers 41 and 42, the mechanism controller 43, and the printer driver 122.

The mechanism controller 43 takes charge of controlling a mechanical mechanism 44 mainly including the transport system and the carriage driving system in a predetermined order on the basis of the command received from the master side controller 41. In this case, the mechanism controller 43 receives a command in the step when the controllers 41 and 42 are synchronized in controlling. Therefore, for example, when a carriage start command is output in the step when one of the controllers 41 and 42 fails to finish print standby, the carriage 31 is started, such that an ejection failure, in which water drops (or other liquid) are not ejected even if the recording head 33 of the controller that fails to finish print standby reaches an ejection position, is prevented. Further, for example, deviation in the print position of the sheet 13, which is caused when one of the controllers 41 and 42 outputs a transport command in a step when not finishing print standby and the sheet 13 starts to be transported (of the sheet 13 suctioned is released), is prevented.

A linear encoder 50 disposed in the movement path of the carriage 31 (that is, the recording unit 30) is connected to the master side controller 41. The master side controller 41 inputs or receives an encoder pulse signal having a number of pulses that is proportionate to the movement distance of the carriage 31 from the linear encoder 50. The encoder pulse signal is input to the slave side controller 42 through the signal line SL2.

The controllers 41 and 42 acquire the position of the carriage 31 in the main scanning direction X (carriage position) from the number count of the number of edges of the pulses of the encoder pulse signal while acquiring the movement direction of the carriage on the basis of the result of comparing signal levels of A-phase and B-phase encoder pulse signals. Further, the controllers 41 and 42 generate ejection timing signals for determining the ejection timing of the recording heads 33 on the basis of the encoder pulse signal from the linear encoder 50. The recording head 33 is synchronized with the ejection timing signal from the nozzle that performs ejecting on the basis of the head control data and controls ejecting of the recording heads 33 during main scanning.

Further, both controllers 41 and 42 are connected through a communication line SL4 and can perform bidirectional communication through the communication line SL4. Both controllers 41 and 42 divisionally take charge of, for example, the image data of or included in the print data PD1 and PD2 and check the boundaries of the image thereof when a necessary image process is applied to the image data.

As shown in FIG. 3, the controllers 41 and 42 each include a CPU 51 (Central Processing Unit), an ASIC 52 (Application Specific Integrated Circuit), a RAM 53, and a non-volatile memory 54. The CPU 51 performs various print control tasks by executing programs stored in the non-volatile memory 54. Further, the ASIC 52 performs data processing of the recording system, including an image process of the print data PD.

As shown in FIG. 3, the mechanical mechanism 44 includes a transport motor 61 included in the transport system, a first carriage motor (hereafter, referred to as a "first CR motor 62") and a second carriage motor (hereafter, referred to as a "second CR motor 63"), which are included in the carriage driving system. The transport motor 61, the first CR motor 62, and the second CR motor 63 are connected to the mechanism controller 43 through the motor driving circuit 60. The transport motor 61 is provided to drive the transport mechanism composed of the rollers 21 to 27, the shafts 20 and 28, and the like.

Further, the first CR motor 62 is a driving source for driving the recording unit 30 in the main scanning direction X (scanning) and the second CR motor 63 is a driving source for driving the recording unit 30 in the sub-scanning direction Y. In the lateral scan method, the main scanning that performs one-pass printing by ejecting ink droplets from the recording head 33 by driving the recording unit 30 in the main scanning direction X while the recording unit 30 is driven and sub-scanning that displaces the recording head 33 to the next main scan position by driving the recording head 30 to a predetermined pitch in the sub-scanning direction Y are alternately performed. Further, the main scanning is performed a predetermined number of times (passes) and one-time (one-frame) printing is performed by printing for or during a plurality of passes. Further, in the embodiment, an example of a transport unit is implemented by the transport motor 61 and the transport mechanism.

Further, as shown in FIG. 3, the mechanical mechanism 44 includes a heater 19A and a drying device 16 included in a drying system, a suction device 34, and a maintenance device 35, which are electrically connected with the mechanism controller 43. Further, a power switch 65, an encoder 66, and temperature sensors 67 and 68 are connected, as an input system, to the mechanism controller 43. An on-signal and an off-signal when the power switch 65 is turned on and off, respectively, is transmitted to the controller 41 through the mechanism controller 43.

Further, the mechanism controller 43 controls driving of the motors 61 to 63, the suction device 34, and the maintenance device 35 in accordance with various communication commands received from the controller 41 through the communication line SL1. The encoder 66 detects rotation of the rotary shaft of the transport driving system having the transport motor 61 as a power source and the mechanism controller 43 detects the transport amount of and the transport position of the sheet 13 by using detection signals (encoder pulse signals) of the encoder 66.

Further, the temperature sensor 67 detects the surface temperature of the support base 19. The mechanism controller 43 inputs a temperature detection signal according to the surface temperature from the temperature sensor 67 and performs temperature control for adjusting the surface temperature of the support base 19 to a set temperature on the basis of the detected temperature determined from the temperature detection signal. The temperature sensor 68 detects furnace-inside temperature (drying temperature) of the drying device 16. The mechanism controller 43 inputs a temperature detection signal according to the furnace-inside temperature from the temperature sensor 68 and performs temperature control for adjusting the furnace-inside temperature of the drying device 16 to a set temperature on the basis of the detected temperature determined from the temperature detection signal.

The control device C performs a transport operation that transports the sheet 13 to dispose the next print target region (frame) of the sheet 13 onto the support base 19 by driving the transport motor 61, a suction operation that suctions the next print target region to the support base 19 after transporting the sheet, a printing operation by the recording head 33 to the sheet 13, and a releasing operation that releases the suctioned sheet 13 after one-time (one-frame) printing is finished. The printing operation (recording operation) in this process is performed by ejecting ink droplets from the recording head 33 while the recording unit 30 moves in the main scanning direction X. The printing operation is performed by repeating movement (one-pass operation) of the carriage 31 in the main scanning direction X by the first CR motor 62 and movement (insertion of a linefeed) of the carriage 31 in the sub-scanning direction Y performed for each end of one pass, by M passes (four passes or eight passes). Meanwhile, for example, when one image is composed of a plurality of plates, an image for one plate is printed by basically M-pass printing operations and one (one-frame) image is printed by repeating the operations as many times as the number of plates. For example, the plural-plate printing may be a two-plate printing that performs printing by straddling the plate of a main image and the plate of an overcoat layer and a three-plate printing that performs printing by straddling the plate of the base layer, the plate of a main image, and the plate of an overcoat layer.

Figure 4:
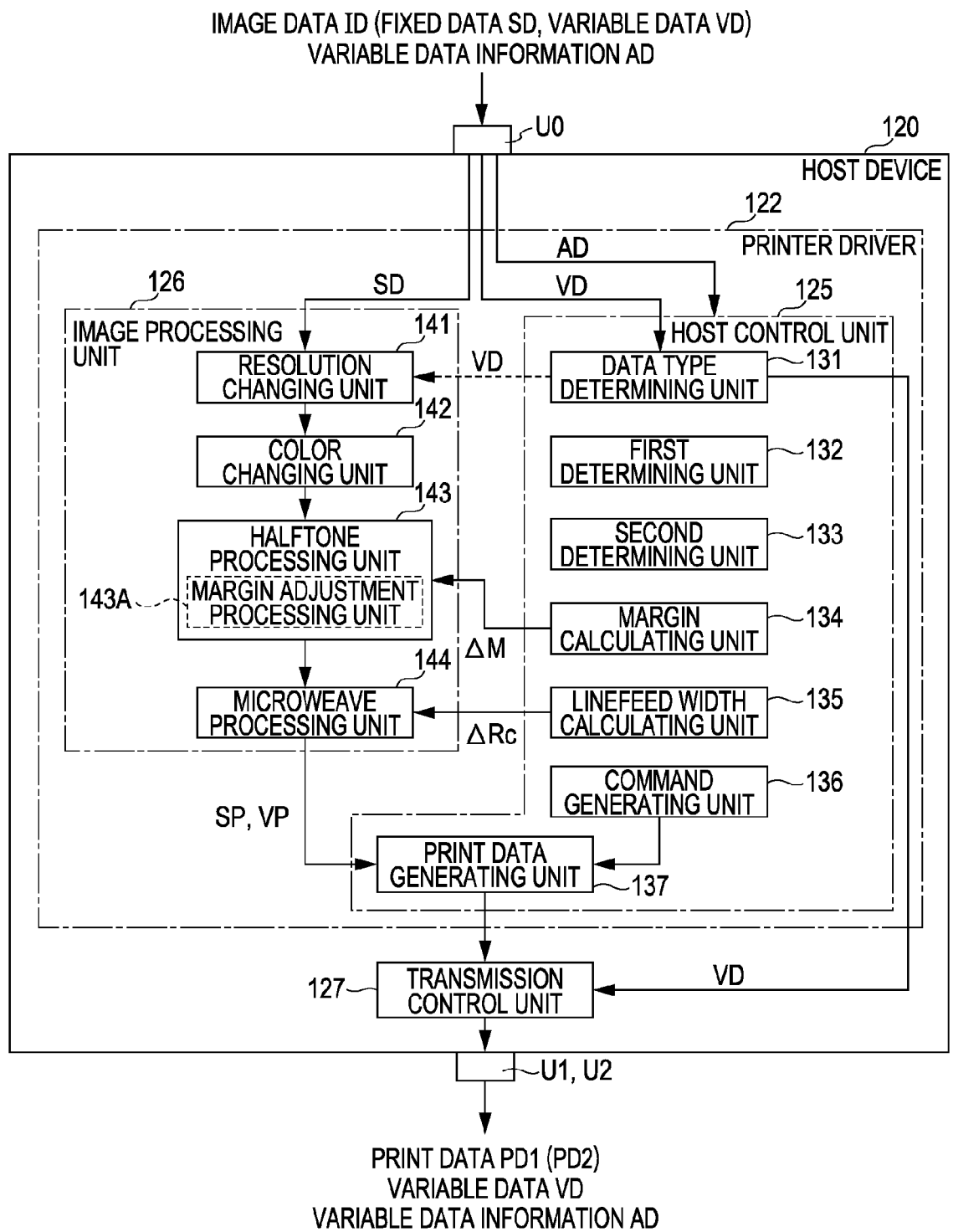
FIG. 4 is a block diagram illustrating an example of a functional configuration of a host device.

As shown in FIG. 4, the host device 120 receives image data ID and variable data information AD from the image generating device 110 through a communication interface U0, which is an example of a data acquiring unit, and generates the print data PD1 and PD2 on the basis of the received image data ID and variable data information AD.

The image processing unit 126 performs an image process for generating print image data of a print color system (for example, a CMYK color system) from the image data ID of a display color system (for example, an RGB color system). In this operation, the image processing unit 126 performs an image process in accordance with an instruction from the host control unit 125.

The host control unit 125 has functions of making various determination for determining processes instructed to or tasked to the image processing unit 126, acquiring various information that is given to the image processing unit 126, if necessary, and generating data that is transmitted to the printer 11.

The host control unit 125 includes a data type determining unit 131, a first determining unit 132 that is an example of a first determining unit, a second determining unit 133 that is an example of a second determining unit, a margin calculating unit 134, a feeding quantity calculating unit 135 that is an example of a calculating unit, a command generating unit 136, and a print data generating unit 137. These units may be used to complete the functions.

Further, the image processing unit 126 includes a resolution changing unit 141, a color changing unit 142, a halftone processing unit 143 that is an example of a first adjusting unit, and a microweave processing unit 144 that is an example of a second adjusting unit. These units enable the image processing unit 126 to perform the image processing.

Figure 6:
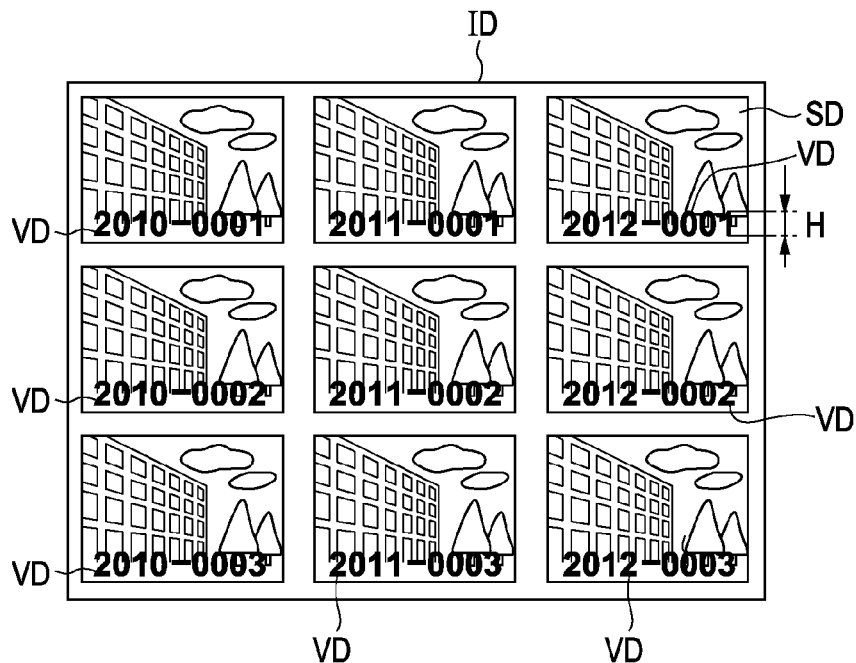
FIG. 6 is a schematic view showing an example of image data.

The image data ID is described with reference to FIG. 6. As shown in FIG. 6, the image data ID is composed of a plurality of frame image data with a plurality of label images arranged in a matrix. The image data ID is composed of fixed data SD in which the background includes the images of a plurality of common (fixed) frames and a plurality of variable data VD composed of character codes of character strings (number strings in the embodiment) combined by a post process to straddle the frame images of the fixed data SD. The content of the variable data VD changes for each frame.

In the embodiment, the fixed data SD is commonly used throughout printing and the variable data VD is prepared for each frame because it is different for each frame, in printing of the product. Therefore, the fixed data SD and a plurality of variable data VD used for the first printing are transmitted first from the image generating device 110, and only a plurality of variable data VD is transmitted in printing after the second. Further, the image shown in FIG. 6 is printed by combining the variable data VD different for each frame to the fixed data SD. Meanwhile, the variable data VD may be implemented by image data by being changed into character codes.

Further, variable data information AD (see FIG. 4) showing the position and size of the variable data AD in the image coordinate system that is common to the fixed data SD is transmitted from the image generating device 110. The variable data information AD is shown by the coordinates of the start point and the end point which are diagonally positioned in a rectangular region that circumscribes the variable image, for example, based on the variable data VD. Accordingly, the height H (corresponding to the width in the sub-scanning direction) of the variable data VD shown in FIG. 6 is acquired by calculating the difference of the Y-coordinate values (vertical coordinate values in FIG. 6) of the start point and the end point in the variable data AD. In the embodiment, a partial variable print instruction is described in a language corresponding to variable printing, for example, a PPML (Personalized Printing Markup Language) and the variable data information AD is included in, for example, the header of the image data ID.

The units 131 to 137 included in the host control unit 125 and the units 141 to 144 included in the image processing unit 126, which are shown in FIG. 4, are described in detail.

The data type determining unit 131 shown in FIG. 4 determines the data type of the variable data VD included in the image data ID. There are two types of code data (for example, character code data) and image data in the variable data VD. The data type determining unit 131 determines whether the variable data VD is code data or image data. The host control unit 125 transmits the variable data VD to the printer 11 through a transmission control unit 127 without performing image processing, when the variable data VD is code data. Meanwhile, when the variable data VD is image data, the host control unit transmits the variable data VD to the image processing unit 126 to perform image processing (the transmission path shown by a dotted line in FIG. 4).

The first determining unit 132 determines whether the variable data VD straddles the boundary of a master recording region and a slave recording region (hereafter, referred to as an "M/S boundary") on the basis of the variable data information AD. The master recording region is the recording regions of a plurality of (eight in the embodiment) recording heads 33A controlled by the master side controller 41 and the slave recording region is the recording regions of a plurality of (seven in the embodiment) recording heads 33B controlled by the slave side controller 42.

Figure 7:
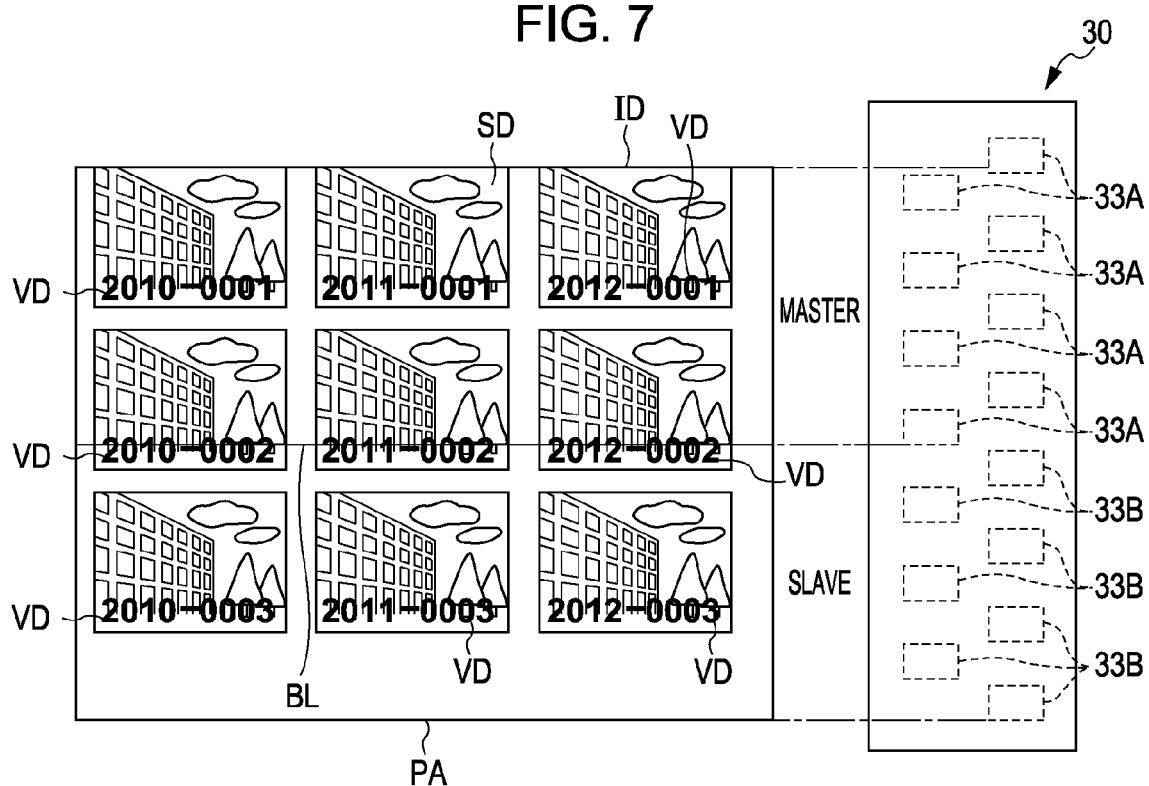
FIG. 7 is an example of a schematic view when variable data straddles an M/S boundary line.

For example, in FIG. 7, substantially the upper half recording region that the upper eight recording heads 33A are in charge of is the master recording region and substantially the lower half recording region that the lower seven recording heads 33B are in charge of is the slave recording region, in a print area PA. Further, in the embodiment, a virtual line showing the boundary of the master recording region and the slave recording region is referred to as an "M/S boundary line BL" (see FIG. 7). Further, the first determining unit 132 simulates M-time insertion of linefeed that is alternately performed with M-time main scanning (pass operation) for each lateral scanning and determines whether the variable data VD straddles the M/S boundary line BL moving in the sub-scanning direction Y for each insertion of a linefeed (that is, the M/S boundary line BL crosses the variable data VD). Meanwhile, the M-time insertion of linefeed includes, in the first-pass main scanning, an initial insertion of a linefeed for disposing the recording unit 30, which is at the M-passth main scan position in the previous lateral scanning, for example, to the first pass position in the present lateral scanning, and M−1-time insertion of linefeed moving the recording unit 30 to the next main scan position after the first-pass scanning to the M−1-pass-th main scanning.

The position data of the M/S boundary line BL is stored in advance in the memory in the host device 120. The first determining unit 132 determines whether the variable data VD straddles the M/S boundary line BL, by using the information on the position and size of the variable data VD in the variable data information AD and the position data of the M/S boundary line BL read out from the memory. For example, in the example of the image data ID shown in FIG. 7, the variable data VD included in the frames in the second line of the image data ID straddles the M/S boundary line BL, in which the first determining unit 132 determines that the variable data VD straddles the M/S boundary line BL.

Referring to FIG. 4 again, the second determining unit 133 determines whether adjustment for preventing the variable data VD from straddling the M/S boundary line BL can correspond only to changing of the feeding quantity $\Delta R$ of the recording unit 30, when it is determined that the variable data VD straddles the M/S boundary line BL by the first determining unit 132. In the embodiment, when it is determined that the variable data VD straddles the M/S boundary line BL, as shown in FIG. 8, when insertion of a linefeed that moves the recording unit 30 in the sub-scanning direction Y (in the white arrow direction in the figure), a specified feeding quantity $\Delta Y$ by which the variable data VD straddles the M/S boundary line BL is changed into a feeding quantity $\Delta R$ by which the variable data VD does not straddle the M/S boundary line BL. That is, the adjustment for preventing the variable data VD from straddling the M/S boundary line BL is performed by adjusting the feeding quantity $\Delta R$.

The feeding quantity calculating unit 135 shown in FIG. 4 calculates a feeding quantity adjustment amount $\Delta Rc$ where the displacement that is adjusted such that the variable data VD does not straddle the M/S boundary line BL is the minimum, by using the position data of the M/S boundary line BL and the information on the position and size of the variable data VD in the variable data information AD. Further, the second determining unit 133 determines whether the feeding quantity $\Delta R$ ($\Delta Ro+\Delta Rc$) acquired by adding the feeding quantity adjustment amount $\Delta Rc$ to an initially set feeding quantity $\Delta Ro$ is the upper limit $\Delta Rmax$ ($\Delta R \leq \Delta Rmax$) of the feeding quantity or less, which is allowable for the recording unit 30. Further, for $\Delta R \leq \Delta Rmax$, the second determining unit 133 determines that adjustment is possible only by changing the feeding quantity $\Delta R$ of the recording unit 30, and for $\Delta R > Rmax$, the second determining unit determines that adjustment is not possible only by changing of the feeding quantity $\Delta R$ of the recording unit 30. Further, the upper limit $\Delta Rmax$ is a limit where a portion that the recording unit 30 cannot print becomes possible during one-time lateral scanning (M-time main scanning), such that a portion that cannot be printed is not generated even when insertion of a linefeed is performed with a feeding quantity $\Delta R$ exceeding the upper limit $\Delta Rmax$. The upper limit $\Delta Rmax$ is a value that is different in accordance with the direction in which insertion of a linefeed is performed. Further, when the feeding quantity $\Delta R$ is a minus value for insertion of a linefeed in the upstream direction of the sub-scanning direction (half linefeed direction), it is determined whether the absolute value of the feeding quantity $\Delta R$ is the upper limit $\Delta Rmax$ ($|\Delta R|\Delta Rmax$) or less in the half linefeed direction.

When the first determining unit 132 determines that the variable data VD straddles the M/S boundary line BL and the second determining unit 133 determines that adjustment is not possible only by the feeding quantity $\Delta R$, the margin calculating unit 134 calculates an upper margin $\Delta M$ (the amount of an upper margin) for preventing the variable data VD from straddling the M/S boundary line BL. In the embodiment, when it is determined that adjustment is not possible only by the feeding quantity $\Delta R$, adjustment of the upper margin $\Delta M$ is also performed, as shown in FIG. 9. As shown in FIG. 9, adjustment for preventing the variable data VD from straddling the M/S boundary line BL is performed by compensating the insufficient adjustment amount of the adjustment of the feeding quantity $\Delta R$ by adjusting the upper margin $\Delta M$, and shifting the image data ID in the up-down direction (sub-scanning direction Y) (upward in the example of FIG. 9) with respect to the sheet region. In this case, the upper margin $\Delta M$ is adjusted such that the image data ID moves opposite the adjustment direction of the feeding quantity (downward in the example of FIG. 9) (the upper margin is slightly adjusted in the example of FIG. 9). The margin calculating unit 134 calculates the insufficient amount for preventing the variable data VD from straddling the M/S boundary line BL as an upper margin adjustment amount $\Delta Mc$, with the available feeding quantity as the maximum $\Delta Rmax$ (the adjustment amount of the feeding quantity is $\Delta Rcmax$). Further, the margin calculating unit 134 calculates the upper margin $\Delta M$ after changing, by adding the upper margin adjustment amount $\Delta Mc$ ($\Delta Mc<0$ in the example in FIG. 9) to the initial margin $\Delta Mo$. The upper margin adjustment amount $\Delta Mc$ is a plus value when the upper margin is increased from the initial value and a minus value when the upper margin is decreased from the initial value. The upper margin adjustment amount $\Delta Mc$ is calculated by the feeding quantity adjustment amount $\Delta Rcmax$, the position data of the M/S boundary line BL, and the position and size of the variable data VD. The margin calculating unit 134 transmits the calculated upper margin $\Delta M$ to the halftone processing unit 143 in the image processing unit 126.

The feeding quantity calculating unit 135 shown in FIG. 4 calculates the feeding quantity $\Delta R$ by using the determination of the second determining unit 133. The feeding quantity calculating unit 135 calculates the feeding quantity adjustment amount $\Delta Rc$ for preventing the variable data VD from straddling the M/S boundary line BL and calculates the feeding quantity $\Delta R$ after changing by adding the feeding quantity adjustment amount $\Delta Rc$ to the initial feeding quantity $\Delta Ro$. In the example, the feeding quantity adjustment amount $\Delta Rc$ is a plus value when the recording unit 30 is shifted in the linefeed direction (downward in FIG. 8) from an initially set position in the sub-scanning direction Y and a minus value when the recording unit is shifted in the reverse linefeed direction (upward in FIG. 8). Further, when both the determination results of the first determining unit 132 and the second determining unit 133 are positive, the feeding quantity calculating unit 135 transmits the feeding quantity adjustment amount $\Delta Rc$ to the microweave processing unit 144 in the image processing unit 126.

The command generating unit 136 generates a print command making the printer 11 print based on the image data ID and the variable data VD. the print command may include a main scan command and a linefeed command (sub-scan command), as carriage system commands, and a transport command, a suction command, a release command, as transport system commands The command generating unit 136 designates a specified feeding quantity $\Delta Ro$ ($\Delta y$ or $-3\Delta y$ in the example of four-pass printing) and generates a linefeed command, when the feeding quantity is not adjusted on the basis of the determination result in the previous linefeed simulation. In detail, the command generating unit generates the first linefeed command (initial linefeed command) for disposing the recording unit 30 to the first-pass position in the sub-scanning direction Y before starting every lateral scanning, by designating the feeding quantity "$-(M-1)\cdot\Delta y$" for returning to the first-pass position. Further, the command generating unit generates a linefeed command for disposing the recording unit 30 to the second-pass to M-pass positions in the sub-scanning direction Y by designating a specified feeding quantity Δy. Meanwhile, when the feeding quantity ΔR is adjusted, the command generating unit 136 generates the j-th linefeed command adjusted to the feeding quantity ΔR by designating the feeding quantity ΔR after adjusting. In detail, when the recording unit 30 is at a standby position before the first lateral scanning is started, insertion of a linefeed for pre-adjusting for moving the recording unit 30 to the position where the variable data VD does not straddle the M/S boundary line BL (hereafter, referred to as "pre-linefeed insertion") is performed. The command generating unit 136 generates a command of the pre-linefeed insertion (pre-linefeed insertion command) by designating the linefeed adjustment amount ΔRc. Further, the command generating unit 136 generates a linefeed command by designating a feeding quantity (ΔRo+ΔRc), for some linefeed insertion of the second to M-th linefeed insertion. Further, the command generating unit 136 generates the initial linefeed command by designating the minus of an accumulated value of the feeding quantity ΔR of the pre-linefeed insertion (first) to M-th linefeed insertion into a feeding quantity.

Next, the units 141 to 144 of the image processing unit 126 are described in detail.

The resolution changing unit 141 performs a resolution changing process that changes the display resolution of the image data to the print resolution.

The color changing unit 142 performs a color changing process that changes colors from a display color system (for example, an RGB color system or an YCbCr color system) to a print color system (for example, a CMYK color system). The color changing process of the color changing unit 142 is performed, for example, with reference to a lookup table showing the changing-corresponding relationship between the display color system and the print color system.

The halftone processing unit 143 performs a halftone process that changes in tone the pixel data of high display gradation (for example, 256 gradations) to pixel data of low (for example, two gradations or four gradations) print gradation. The halftone process is performed by a systematic dither method or an error diffusion method. The halftone processing unit 143 of the embodiment includes a margin adjustment processing unit 143A that adjusts the upper margin on the basis of the upper margin ΔM acquired from the margin calculating unit 134. The margin adjustment processing unit 143A performs an image process that adjusts the upper margin (the amount of the upper margin) by adding dummy data (blank data of a non-ejecting value) of a pixel number width (number of lines) corresponding to the upper margin ΔM after adjustment to the image data ID. Further, the halftone processing unit 143 performs a halftone process on the image data (for example, CMYK display color image data) after being adjusted in color by the margin adjustment processing unit 143.

The microweave processing unit 144 performs a microweave process on the halftone data after the halftone process. The microweave process is a data process that generates data for performing a microweave print method (interlaced recording method) that suppresses bending (striped non-uniform intensity) caused by the difference of gaps (line gaps) of print dot lines printed in the main scanning direction, due to a difference in the position of the nozzles 38 (nozzle pitch) of the recording heads 33A and 33B. One dot line of the print dots in the main scanning direction X, which is formed by landing of the ink droplets continually ejected from the nozzle 38 on the sheet 13 by the main scanning of the recording unit 30, is called a raster line. The microweave process performs a pass division process that divides the image data after the halftone process for each pass such that the gaps (line gaps) of the raster lines printed at the first pass in the M-time passes are embedded raster lines printed at the second to M-th passes when printing is performed with M passes per lateral scanning such that the raster lines adjacent to each other in the sub-scanning direction Y do not depend on the gap of the nozzles adjacent to each other in the sub-scanning direction Y.

That is, one-time lateral scanning is performed by plotting maximally n raster lines by printing one pass by using all (n) the nozzles, plotting a raster line such that the gap between the raster lines of the previous pass are embedded by the second pass, and repeating this process to the M pass such that the entire raster line gaps of the first raster line are embedded. Bending (striped non-uniform intensity) in the main scanning direction X caused by the difference between the line gaps of the rater lines due to the position difference (difference in nozzle pitch) in the sub-scanning direction Y of the nozzle 38 is suppressed by the lateral scanning that is cycled with M passes.

The microweave processing unit 144 of the embodiment divides the fixed image data after the halftone process into M fixed image data SPi for each pass (i indicates the number of pass, i=1, 2, . . . , M) by performing a pass division process. The microweave processing unit 144 further performs nozzle division sequentially for each pass on the M fixed image data SPi. The nozzle division is a process that divides the pixels (dots) of the fixed image data SPi to the nozzles 38 while designating nozzle numbers, when all of the nozzles for one ink color is n nozzles 38 having nozzle numbers #1 to #n, for example. In the example, the number n of all of the nozzles for one ink color is determined by the number of nozzles per nozzle line (for example, 180)×the number of heads (for example, 15). The microweave processing unit 144 performs nozzle division by deviating the nozzle by the feeding quantity adjustment amount ΔRc, for the pass with the feeding quantity adjusted, when performing nozzle division on the fixed image data SPi for each pass, when acquiring the feeding quantity adjustment amount ΔRc from the feeding quantity calculating unit 135.

There are first linefeed insertion (initial linefeed insertion) for returning the recording unit 30 to the position of the first pass and second to M-th passes performed alternately with the main scanning of the passes, in the linefeed insertion. The first linefeed insertion is linefeed insertion of returning the recording unit 30 to the position of the first pass from the position of the M pass of the previous lateral scanning, in which the feeding quantity ΔRo is −(M−1)·Δy (for example, ΔRo=−3Δy in four-pass printing). Further, the second to M-th linefeed insertion is linefeed insertion for moving the recording unit 30 to the position of the next main scanning in the sub-scanning direction Y after the main scanning, in which the feeding quantity ΔRo is ΔRo=Δy. The feeding quantity ΔRo is a specified feeding quantity before initially set adjustment.

In the example, Δy is, for example, 1/M of the nozzle pitch Δn, and for Δy<Δn, the linefeed adjustment amount ΔRc is a natural number times the nozzle pitch Δn (ΔRc=K·Δn (K is a natural number)). Therefore, the microweave processing unit 144 divides the pixels to an upstream nozzle in the sub-scanning direction by the linefeed adjustment amount ΔRc (that is, K), more than the nozzle divided for the initial feeding quantity Δy, when the feeding quantity adjustment amount ΔRc is plus (that is, the feeding quantity increases). Further, the microweave processing unit divides the pixels to a downstream nozzle in the sub-scanning direction by the linefeed adjustment amount ΔRc (that is, by the number of K), more than the nozzle divided for the initial feeding quantity Δy, when the feeding quantity adjustment amount ΔRc is minus (that is, the feeding quantity decreases). Further, the fixed image data SP (variable image data VP when the variable data VD is image data) composed of M fixed image data SPi generated by the microweave process is sequentially transmitted to the print data generating unit 137 from the microweave processing unit 144.

The print data generating unit 137 further divides the M fixed image data SP1 to SPM for each of the recording heads 33A and 33B. That is, the print data generating unit 137 divides the M fixed image data SP1 to SPM into M fixed image data SPAi (i=1, . . . , M) to transmit to the master side controller 41 for use in eight recording heads 33A and M fixed image data SPBi (i=1, . . . , M) to transmit to the slave side controller 42 for use in seven recording heads 33B.

The print data generating unit 137 generates print data PD1 by applying a header including a print command to the fixed image data SPA composed of the M fixed image data SPAi and generates print data PD2 by applying a header including a print command to the fixed image data SPB composed of the M fixed image data SPBi. Further, when the variable data VD is image data, the print data generating unit 137 also includes the variable image data VP generated by the image processing unit 126 on the basis of the variable data VD in the print data PD1 and PD2. Further, print data generating unit 137 also adds the information on the image process including some used for the image process in the linefeed adjustment amount ΔRc and the upper margin ΔM, as a portion of the headers of the print data PD1 and PD2, when adjusting the feeding quantity ΔR or the upper margin ΔM.

Further, the host control unit 125 designates a serial communication port U3 as a transmission destination, gives an instruction of transmitting the print data PD1, the variable data VD, and the variable data information AD, to the transmitting control unit 127, designates a serial communication port U4 as a transmission destination, and gives an instruction of transmitting the print data PD2, the variable data VD, and the variable data information AD, to the transmitting control unit 127. The transmission control unit 127 compresses the data from the print data generating unit 137 and then transmits the data to the printer 11.

Further, the pixel arrangement order of the image data (pixel reading order) is read in the row direction in the order of the first row, second row, third row, . . . (in the order from the upper side to the lower side in FIG. 6), sequentially from the pixel at the left end to the right (in the transverse direction) in each row in the image shown in FIG. 6. In this operation, the row direction (transverse direction) of the image corresponds to the main scanning direction X in plotting of the recording heads 33A and 33B. Therefore, in the description of the image process, the main scanning direction is the row direction (transverse direction) of the image and the sub-scanning direction is the column direction of the image.

Figure 5:
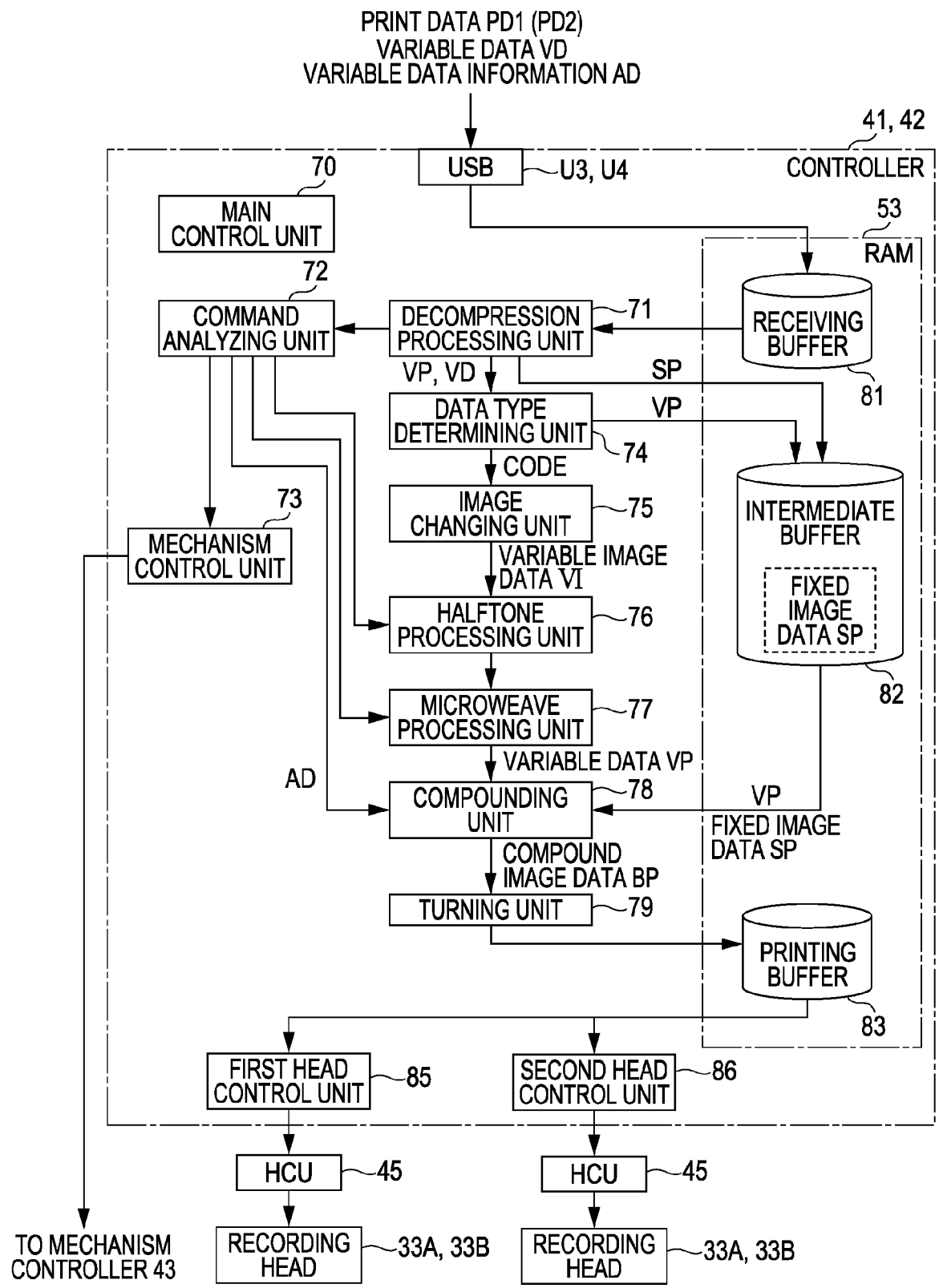
FIG. 5 is a block diagram illustrating an example of a functional configuration of a printer.

FIG. 5 is a block diagram showing a functional configuration of the controllers 41 and 42 for the printer 11. Further, the functional configurations for the print control of the controllers 41 and 42 are basically the same, such that the functional configuration of the master side controller 41 is illustrated in FIG. 5. Further, the fixed image data SPA and SPB is not specifically discriminated and described just as fixed image data SP in FIG. 5.

As shown in FIG. 5, a functional unit implemented when the CPU 51 executes the program stored in the non-volatile memory 54 and a functional unit implemented by various electronic circuits in the ASIC 52 are disposed in the controller 41. That is, as shown in FIG. 5, the controller 41 includes a main control unit 70, a decompression processing unit 71, a command analyzing unit 72, a mechanism control unit 73, a data type determining unit 74, an image changing unit 75 that is an example of a changing unit, a halftone processing unit 76 that is an example of a first adjusting unit, a microweave processing unit 77 that is an example of a second adjusting unit, a compounding unit 78 that is an example of a combining unit, a crisscross conversion processing unit 79, a first head controller 85, and a second head controller 86. Further, the units 70 to 79, 85, and 86 are implemented, for example, by combination of software and hardware, but may be implemented only by software or only by hardware.

A receiving buffer 81, an intermediate buffer 82, and a print buffer 83 are disposed in the RAM 53. The receiving buffer 81 stores print data PD1 (PD2), variable data VD, and variable data information AD that the serial communication port U3 (U4) (for example, a USB port) receives from the host device 120. The intermediate buffer 82 stores print image data in the print data PD1 (PD2) or plain data generated by applying a predetermined process to the print image data. The plain data stored in the intermediate buffer 82 is, for example, fixed image data SP. Further, the print buffer 83 stores head control data generated by applying a predetermined process to the plain data. The head control data is control data having a format that is available for driving control of an ejection driving element, such as a piezoelectric element, in which a head driving circuit (not shown) is disposed for each nozzle in the recording head 33A (33B). Data transmission between the units 71, 72, and 74 to 79 of the image processing system and the RAM 53 and between the RAM 53 and the head controllers 85 and 86 is performed by a DMA controller (not shown) in accordance with instructions of the CPU 51. Further, other than the piezoelectric element, an electrostatic element or a heating element that heats the ink to generate bubbles ejecting ink droplets in a thermal type may be used as the ejection driving unit.

Next, the units 70 to 79 shown in FIG. 5 are described.

The main control unit 70 generally controls the units 71 to 79.

The decompression processing unit 71 decompresses the print data PD1 (PD2), variable data VD, and variable data information AD, which are stored in the receiving buffer 81. The decompressed print data PD1 (PD2) includes plain data (fixed image data SP (or fixed image data SP and variable image data VP)), a print command described in a print language, and image process-related information used for the image processing in the host side in the linefeed adjustment amount ΔRc and the upper margin ΔM. The fixed image data SP is stored in the intermediate buffer 82 (a storing unit) and the print command is transmitted to the command analyzing unit 72. Further, the variable image data VP or the variable data VD is transmitted to the data type determining unit 74. Further, the variable data information AD is transmitted to the command analyzing unit 72. Further, in the embodiment, the fixed image data SP received in the first printing and stored in the intermediate buffer 82 is kept stored and used for the second to the last printing. Therefore, the image processing for generating the fixed image data SP from the fixed data SD in the printer driver 122 is basically performed only at the first time. Obviously, the printer driver 122 may generate the fixed image date SP every time.

The command analyzing unit 72 analyzes the print command acquired from the decompressed print data PD1 (PD2) and transmits the command acquired by the analysis to the mechanism control unit 73. Further, the command analyzing unit 72 analyzes the variable data information AD, the image process-related information (feeding quantity adjustment amount ΔRC, upper margin ΔM, and the like) and transmits the variable data information AD to the compounding unit 78 while transmitting the image process-related information to the microweave processing unit 77.

The data type determining unit 74 determines whether the variable data is the variable data VD implemented by code data or the variable image data VP of the CMYK color system which has undergone image processing. When the variable data is the variable data VD implemented by code data, conversion from the code data to the image data is necessary, such that the variable data VD is transmitted to the image changing unit 75. On the other hand, when the variable data is the variable image data VP that has undergone image processing, the image processing is not necessary, such that the variable image data VP is stored in the intermediate buffer 82.

The image changing unit 75 shown in FIG. 5 converts the variable data VD into the image data from the code data. The image changing unit 75 is implemented, for example, by a character generator that outputs font data (formation data) of a character corresponding to a character code when the character code is input. The character code may be, for example, ASCII code, JIS code, shift JIS code, Unicode, or EUC code. Further, image changing unit 75 according to the embodiment also has a function of a code generator that converts a character string written by character codes into a one-dimensional or two-dimensional code image (formation data). Therefore, the image changing unit 75 can perform conversion into font data shown in FIGS. 6 and 7 and conversion into a one-dimensional code, such as barcode, or a two-dimensional code, such as QR code, on the basis of designation information for designating the format of the conversion destination of the variable data VD. As described above, the image changing unit 75 generates variable image data VI by converting the code of the variable data VD into font data, a one-dimensional code, or a two-dimensional code.

The halftone processing unit 76 shown in FIG. 5 has the same function as the halftone processing unit 143 for the printer driver 122, such that the halftone processing unit 76 converts the variable image data VI into two-gradation or four-gradation image data by applying a halftone process to the variable data. There are two methods in the image processing of the variable image data VI. One is a method of applying an image process to one entire image data with a plurality of variable images arranged in each frame and the other one is a method of individually applying an image process to the variable image data VI provided in each frame. In the former, the halftone processing unit 76 adds dummy data (blank data of a non-ejecting value) of the number of rows as much as the upper margin ΔM acquired from the command analyzing unit 72 to an upstream position in the sub-scanning direction (inverse linefeed direction) of the variable image data VI. Further, a halftone process is applied to the variable image data VI after the dummy data is added. Meanwhile, in the latter, the halftone processing unit 76 applies a halftone process to the individual variable image data VI and applies correction that shifts the Y-coordinates to the downstream side in the sub-scanning direction as much as the upper margin ΔM, in each position coordinates of the image coordinate system of each variable image data VI acquired from the variable data information AD. Further, the halftone processing unit 76 transmits variable image data by M after the halftone process to the microweave processing unit 77 with each position coordinate data.

The microweave processing unit 77 shown in FIG. 5 has the same function as the microweave processing unit 144 for the printer driver 122. That is, the microweave processing unit 77 applies a microweave process to the variable image data VI after the halftone process. First, the microweave processing unit 77 divides the variable image data VI into M variable image data VPi that is the same as the number of passes M per lateral scanning (where i indicates the number of pass, i=1, 2, . . . , M) by applying a pass division process to the variable image data VI after the halftone process. Further, the microweave processing unit 77 performs nozzle division sequentially for each pass on the M variable image data VPi. In this operation, when nozzle division is performed on the variable image data VPi for each pass, nozzle division is performed by deviating the nozzles as much as the feeding quantity adjustment amount ΔRc, on the pass right after linefeed insertion with the feeding quantity adjusted. That is, the microweave processing unit 77 divides the pixels to an upstream nozzle in the sub-scanning direction by the linefeed adjustment amount ΔRc, more than the nozzle divided for the initial feeding quantity Δy, when the feeding quantity adjustment amount ΔRc is plus (that is, the feeding quantity increases). Further, the microweave processing unit divides the pixels to a downstream nozzle in the sub-scanning direction by the linefeed adjustment amount ΔRc (that is, by the number of K), more than the nozzle divided for the initial feeding quantity ΔRo, when the feeding quantity adjustment amount ΔRc is minus (that is, the feeding quantity decreases).

Meanwhile, in the method of individually applying the microweave process to the variable image data VI for each frame, the microweave processing unit 77 generates M variable image data VPi for one variable image data for each frame by applying the pass division process to the variable image data VI after the halftone process. Further, nozzle division is performed on the M variable image data VPi, with reference to the position coordinates after the correction in which correction as much as the upper margin is added to the position coordinate of the variable image data. Further, the microweave processing unit 77 transmits the M variable image data VPi after the nozzle division to the compounding unit 78 after the correction, together with the position coordinates after the correction.

The M variable image data VPi acquired after the microweave process becomes data matched in position with the fixed image data SP. That is, the fixed image data SP1 to SPM of the first pass to the M-th pass and the variable image data VP1 to VPM of the first pass to the M-th pass are matched in position in the same passes. Further, the variable image data VP implemented by the M variable image data VPi generated by the microweave process is transmitted to the compounding unit 78 from the microweave processing unit 77.

The compounding unit 78, which is an example of a combining processing unit) shown in FIG. 5 performs image composition that combines the fixed image data SP with the variable image data VP. The fixed image data SP used in this operation is received from the host device 120 in the first printing, but the fixed image data received in the first printing and received in the intermediate buffer 82 is read out from the intermediate buffer 82 to be used in the printing after the second printing. Further, the variable image data VP is data that has undergone the image processes in the printer 11 and is acquired from the microweave processing unit 77 when the variable data VD is code data or data that the printer 11 receives from the host device 120 and that is stored in the intermediate buffer 82 when the variable data VD is image data. The compounding unit 78 combines the fixed image data SP with the variable image data VP in each corresponding pass and generates M (M-pass) composite image data BPi (where i indicates the number of pass, i=1, 2, . . . , M). Meanwhile, when there is the same number of variable image data VI for each frame, as the number of frames, the compounding unit 78 generates M composite image data BPi (where i=1, 2, ..., M) by combining the fixed image data SP with the variable image data VP in each corresponding pass, with reference to the position coordinates after the correction of the variable image data VP.

The crisscross conversion processing unit 79, which is an example of a turning unit, performs a crisscross conversion process to the composite image data BP that has undergone the combining process in the compounding unit 78. The composite image data BP is data with pixels arranged in the transverse direction (row direction) of alignment sequence (reading sequence) for display. In the crisscross conversion process, the alignment sequence (reading sequence) of the pixels of the composite image data BP is converted into the longitudinal direction (column direction) of the nozzle arrangement direction from the transverse direction (row direction) for display, in accordance with the order of ejecting ink droplets from the nozzles 38 of the recording head 33A (33B) (that is, the arrangement order of the nozzles). That is, the crisscross conversion processing unit 79 sequentially converts the alignment sequence of the pixels sequentially aligned in the transverse direction (row direction) into the longitudinal direction (column direction) of the nozzle column direction, in the order of 180 pixels ejected in the first time from 180 nozzles 38 for one pass, 180 pixels ejected in the second time, . . . and 180 pixels finally ejected. The crisscross conversion process is performed with reference to the nozzle division data. The M (M-pass) head control data generated by the crisscross conversion process is stored in the print buffer 83. The M head control data stored in the print buffer 83 is sequentially transmitted by one pass to the first and second head controllers 85 and 86.

The first and second head controllers or head control units 85 and 86 shown in FIG. 5 divide the one-pass head control data, which is transmitted from the print buffer 83, for each column of the recording head 33A (33B) and transmit the head control data in the corresponding column to the head control unit 45 (HCU). The first head controller or control unit 85 is in charge of controlling four recording heads 33A (or three recording heads 33B) pertaining to the left column (first column) in the eight recording heads 33A (or seven recording heads 33B) shown in FIG. 2 and the second head controller or control unit 86 is in charge of controlling four recording heads 33A (33B) pertaining to the right column (second column). The first head control unit 85 selects the data corresponding to the four recording heads 33A (or three recording heads 33B) pertaining to the first column, in the head control data, distributes the data to the HCUs 45, and transmits the distributed head control data to the four recording heads 33A (or three recording heads 33B) pertaining to the first column through the HCUs 45. The second head control unit 86, similarly, selects the data corresponding to the four recording heads 33A (33B) pertaining to the second column, in the one-pass head control data, distributes the data to the HCUs 45, and transmits the distributed head control data to the four recording heads 33A (33B) pertaining to the second column through the HCUs 45.

The recording head group in the first column and the recording head group in the second column which are disposed at different positions (columns) in the main scanning direction X in the recording unit 30 are to be controlled with the ejection timing delayed as much as the distance between the columns, even if the recording positions in the main scanning direction X are the same. In the embodiment, two head control units 85 and 86 are divided for each column (recording head group) that is controlled at the same ejection timing. Therefore, the head control units 85 and 86 may perform one type of control for the recording head group in the corresponding columns. For example, when a configuration of controlling recording heads in two columns with one head controller, it is necessary to control the recording head groups in the first column and the second column, such that two control lines are necessary. It is possible to achieve one line control that performs controlling at one ejection timing by disposing the head control units 85 and 86 for recording head groups in different columns, respectively.

The head driving circuit (not shown) in the recording heads 33A (33B) controls driving of the ejection driving elements of the nozzles 38 on the basis of the head control data such that the nozzles 38 eject ink droplets. In this operation, the ejection timings of the recording heads 33A (33B) are achieved by the head driving circuit controlling the driving timing of the ejection driving element on the basis of the ejection timing signals generated by the first and second head control units 85 and 86, based on an encoder pulse signal of a linear encoder 50.

Further, the mechanism control unit 73 shown in FIG. 5 transmits the command received from the command analyzing unit 72 to the mechanism controller 43. As described above, the command may be a transport command, a suction command, a main scan command, a linefeed inserting command (sub-scan command), and/or a release command. The mechanism control unit 73 transmits the command to the mechanism controller 43 while synchronizing the controllers 41 and 42 at an appropriate timing according to the progress of the mechanism controller 43 by monitoring the progress of the mechanism controller 43.

The mechanism controller 43 shown in FIG. 3 controls driving of the mechanical mechanism 44 in accordance with the command. The mechanism controller 43 makes the print target region of the sheet 13 be suctioned to the upper surface of the support base 19 by transporting the sheet 13 until the next print target region is positioned on the support base 19 by driving the transport motor 61 in accordance with the transport command, and driving the suction device 34 in accordance with the suction command after the sheet is transported. Further, the mechanism controller 43 moves the recording unit 30 in the main scanning direction X by driving the first CR motor 62 in accordance with the main scan command. In this operation, the recording heads 33A and 33B controlled by the controllers 41 and 42 eject ink droplets from the nozzles 38 and one-pass printing is performed on the print target region of the sheet 13. Further, the mechanism controller 43 moves the recording unit 30 to the next main scan position (next pass position) in the sub-scanning direction Y by driving the second CR motor 63 in accordance with a linefeed insertion command (sub-scan command), every time one pass is finished. Thereafter, main scanning and linefeed insertion (sub-scanning) of the recording unit 30 are alternately repeated and the carriage 31 performs M-pass printing, thereby printing, for example, one (one-frame) image (product). When one-frame image finished printing, the mechanism controller 43 releases the sheet 13 suctioned by the suction device 34 in accordance with the suction command, and then transports the sheet 13 to the next print position by driving the transport motor 61 in accordance with a transport command. Further, when multiple plate printing is performed, one (one-frame) image (product) is printed by repeating M-pass several times. Further, in this embodiment, although a fixed image and a variable image are printed in one plate on the basis of the composite image data in the embodiment, it is possible to print the variable image in the second plate by printing the fixed image in the first plate.

Figure 10:
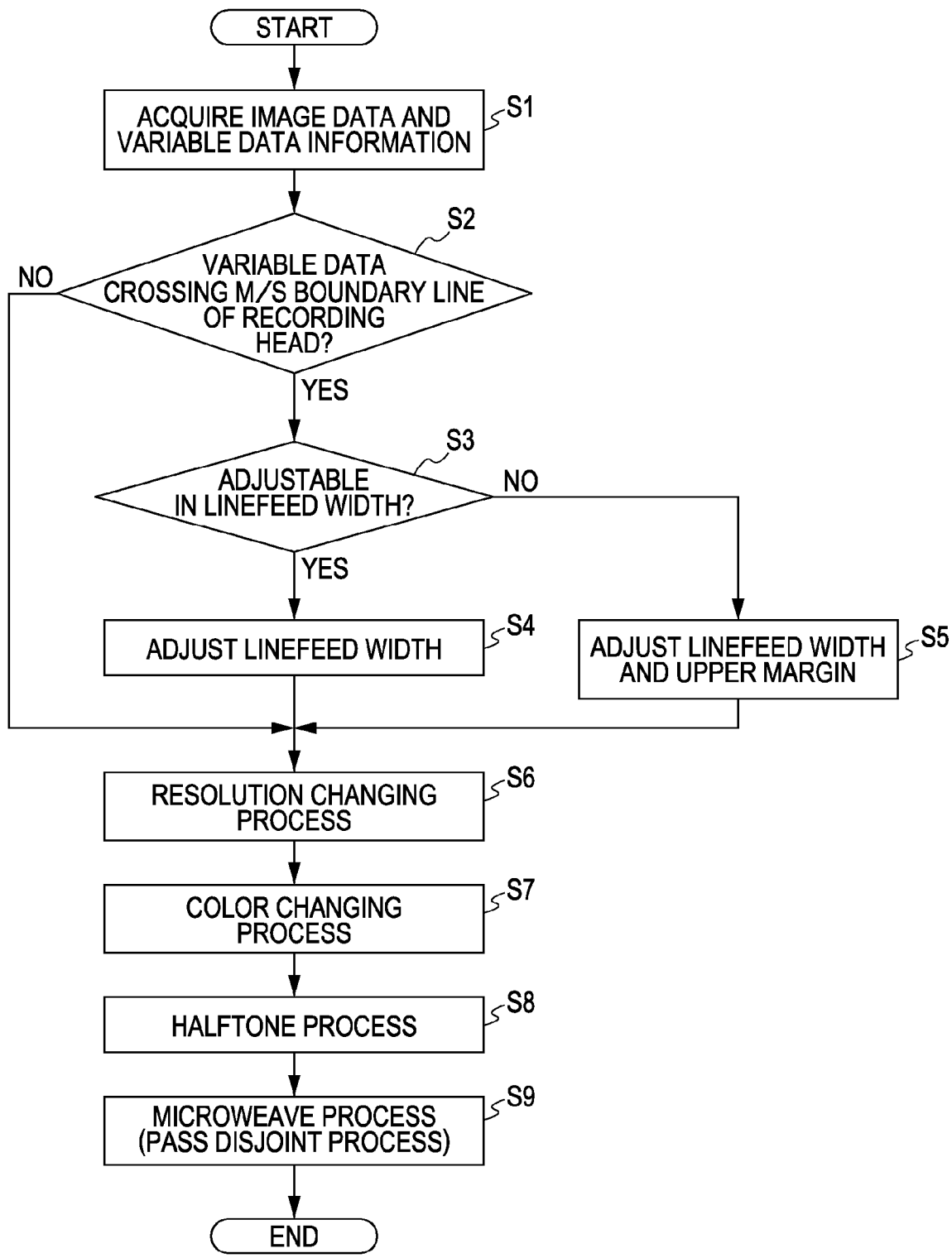
FIG. 10 is a flowchart showing an example of a process of a printer driver.
Figure 11:
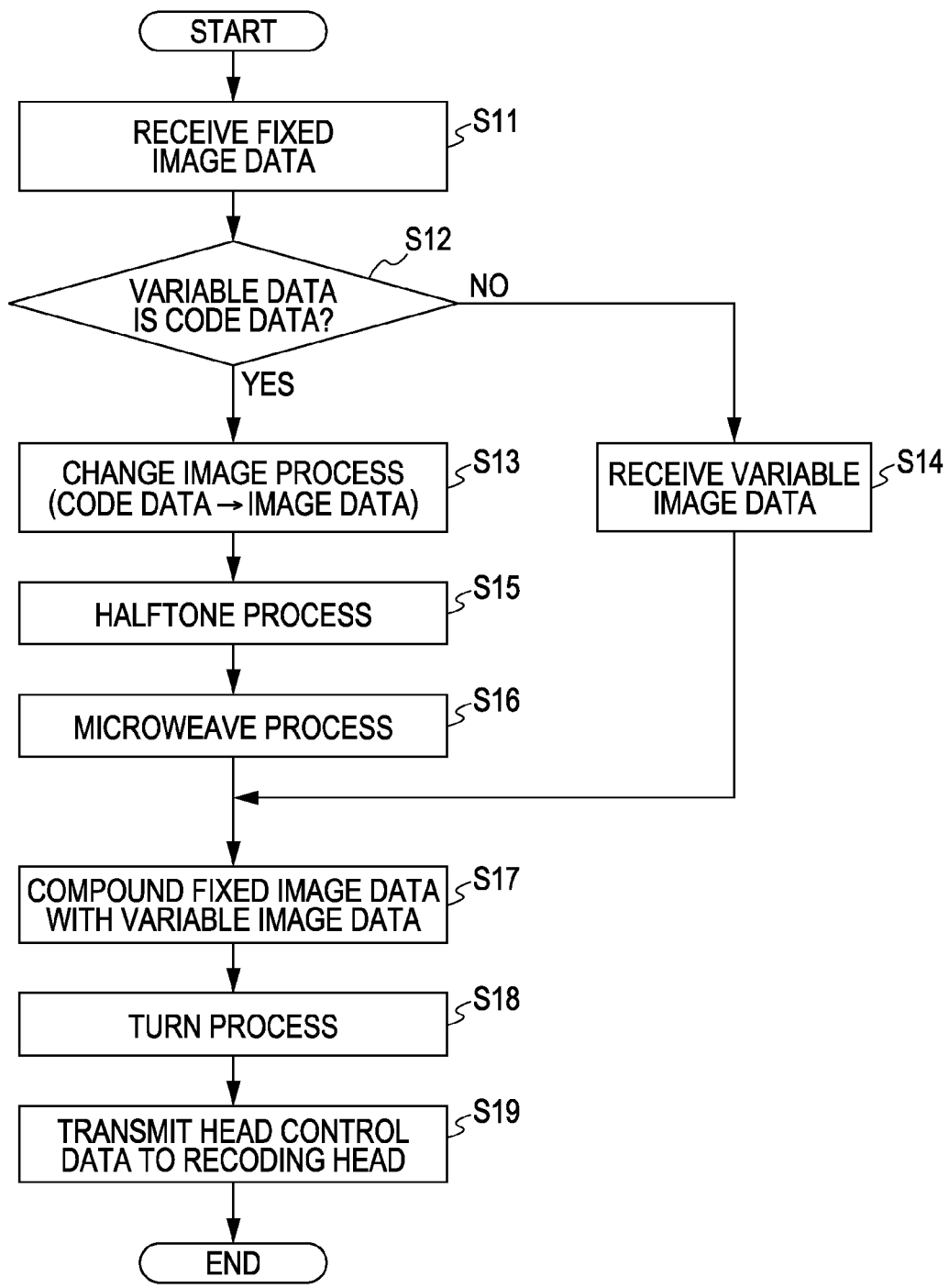
FIG. 11 is a flowchart showing an example of a process of a printer.

Next, the operation of the printer 11 is described with reference to the flowcharts shown in FIGS. 10 and 11. The process in the host device 120 (printer driver 122) is described first in accordance with FIG. 10 and then the process in the printer 11 is described in accordance with FIG. 11. The process of FIG. 10 is performed by the printer driver 122 and is implemented by executing a program with a computer (for example, a CPU) in the host device 120. Further, it is assumed that the variable data VD is character code data. In this case, since it is determined that the variable data VD is character code data by the data type determining unit 131, an image process is not performed on the variable data VD in the following processes.

First, image data and variable data are acquired in Step S1. That is, the host device 120 receives image data ID and variable data information AD from the image generating device 110 or reads out image data ID and variable data information AD, which are received in advance and stored in a predetermined buffer (RAM) in the host device 120, from the buffer.

In step S2, determined determination is made as to whether the variable data VD straddles the M/S boundary line BL of the recording heads 33A and 33B. The first determining unit 132 makes the determination. The first determining unit 132 determines whether the variable data VD straddles the M/S boundary line BL every time a linefeed is inserted, by simulating a linefeed insertion several times, which is performed in a one-time lateral scanning. When there is at least one linefeed insertion where the variable data VD straddles the M/S boundary line BL, the determination result is determined as positive and the process proceeds to step S3, or when there is no linefeed insertion where the variable data VD straddles the M/S boundary line BL, the determination result is determined as negative and the process proceeds to step S6.

In step S3, it is determined whether adjustment of a feeding quantity is possible. The second determining unit 133 makes the determination. In this operation, the feeding quantity calculating unit 135 calculates the feeding quantity adjustment amount $\Delta Rc$ and the feeding quantity is adjusted accordingly such that all of the variable data VD do not straddle the M/S boundary line BL, in the linefeed that is determined to be straddled by the first determining unit 132, by using the position data of the M/S boundary line BL and the variable data information AD. Further, the feeding quantity calculating unit 135 calculates a feeding quantity $\Delta R$ (=$\Delta Ro+\Delta Rc$) after the adjustment by adding the feeding quantity adjustment amount $\Delta Rc$ to the initial feeding quantity $\Delta Ro$ (=$\Delta y$ or $-3\Delta y$). For example, when it is determined that the variable data VD straddles the M/S boundary line BL, at the position of the first pass of the recording unit 30, in the first lateral scanning (printing), the feeding quantity adjustment amount $\Delta Rc$ from the present standby position of the recording unit 30 to the position where the variable data VD does not straddle the M/S boundary line BL is made. Further, the feeding quantity adjustment amount $\Delta Rc$ is set as the feeding quantity $\Delta R$ of pre-linefeed insertion for disposing in advance the recording unit 30 to the first-pass position before the first lateral scanning is started. Further, when it is determined that the variable data straddles the M/S boundary line BL at any one or more positions of the second pass to the M pass of the recording unit 30, the feeding quantity $\Delta R$ is calculated from $\Delta R=\Delta y+\Delta Rc$ in the linefeed insertion right before the pass where it is determined that the variable data straddles the boundary line in the second to M-th linefeed insertion. Further, the feeding quantity $\Delta R$ of the initial linefeed insertion for returning to the first-pass position in the lateral scanning after the second is calculated by giving a minus to the accumulated value from the feeding quantity $\Delta R$ of the first pre-linefeed insertion to the M-th feeding quantity $\Delta R$.

Further, the second determining unit 133 determines whether the feeding quantity $\Delta R$ (the absolute value for $\Delta R<0$) is an upper limit $\Delta Rmax$ of more of an available feeding quantity for the recording unit 30. The second determining unit 133 determines that adjustment with the feeding quantity $\Delta R$ is possible for $\Delta R \leq \Delta Rmax$ and determines that adjustment with the feeding quantity $\Delta R$ is not possible for $\Delta R > \Delta Rmax$. When there are a plurality of linefeeds in which the result of the determination of the first determining unit 132 is determined as positive, the second determining unit 133 determines that adjustment with the feeding quantity is possible only when $\Delta R \leq \Delta Rmax$ is satisfied for all of the linefeeds. When the adjustment with the feeding quantity is possible on the basis of the determination result, the process proceeds to step S4, or when the adjustment is not possible, the process proceeds to step S5.

The feeding quantity is adjusted in step S4. That is, the feeding quantity of the linefeed where it is determined that the variable data VD straddles the M/S boundary line BL is changed into the initial feeding quantity $\Delta Ro$ (=$\Delta y$ ($\Delta Ro=0$ for the first pre-linefeed insertion)) and the feeding quantity $\Delta R$(=$\Delta Ro+\Delta Rc$) where the feeding quantity adjustment amount $\Delta Rc$ calculated by the feeding quantity calculating unit 135 is added. The adjustment of the feeding quantity is performed by, for example, receiving the feeding quantity adjustment amount $\Delta Rc$ in the microweave processing unit 144 and generating a linefeed insertion command by designating a feeding quantity $\Delta R$ after changing by the command generating unit 136.

Meanwhile, when adjustment with the feeding quantity is not possible, the feeding quantity and the upper margin are adjusted in step S5. That is, the feeding quantity calculating unit 135 calculates the upper limit value $\Delta Rmax$ of the feeding quantity and the margin calculating unit 134 calculates an adjustment amount, which is insufficient even if the feeding quantity is adjusted to the upper limit value $\Delta Rmax$, as an upper margin adjustment amount $\Delta Mc$, in order to prevent the variable data VD from straddling the M/S boundary line BL. Further, the margin calculating unit 134 acquires an upper margin $\Delta M$ (=$\Delta Mo+\Delta Mc$) after the adjustment by adding the upper margin adjustment amount $\Delta Mc$ to the initial upper margin $\Delta Mo$. Further, the adjustment of the upper margin is performed by, for example, transmitting the upper margin $\Delta M$ ($\Delta M=\Delta Mo+\Delta Mc$) to a margin adjustment processing unit 143A of the halftone processing unit 143 after the adjustment. Further, when the upper margin is not adjusted, the initial upper margin $\Delta M$ (=$\Delta Mo$) is transmitted to the margin adjustment processing unit 143A. Further, when adjustment is not possible even if the upper margin is used in combination, the printer driver 122 generates variable image data VP by applying an image process to the variable data VD and transmits composite image data of the variable image data VP and fixed image data SP to the printer 11.

A resolution changing process is applied to the fixed data SD in step S6. The process is performed by the resolution changing unit 141.

A color changing process is applied to the fixed data SD after the resolution changing process in step S7. The process is performed by the color changing unit 142.

A halftone process is applied to the fixed data SD after the color changing process in step S8. The process is performed by the halftone processing unit 143. First, the margin adjustment processing unit 143A performs a process of adding dummy data for the pixel number width (number of rows) corresponding to the upper margin $\Delta M$ to the upper side of the fixed data SD (in the inverse linefeed direction). When the upper margin ΔM adjusted in step S5 is acquired, dummy data for the pixel number width (number of rows) corresponding to the upper margin ΔM (=ΔMo+ΔMc) after the adjustment is added to the upstream side in the sub-scanning direction (inverse linefeed direction) of the fixed data SD. Further, the halftone processing unit 143 applies a halftone process to the fixed data SD after the upper margin is adjusted. Further, when the upper margin is not adjusted, dummy data for the number of rows corresponding to the initial upper margin ΔMo is added.

A microweave process is applied to the fixed image data after the halftone process in step S9. The process is performed by the microweave processing unit 144. The microweave process 144 divides the fixed image data into M fixed image data SPi by applying a pass dividing (or a pass disjoint) process to the fixed image data. The microweave processing unit 144 further performs nozzle division sequentially dividing the pixels one by one (one pass) for the M fixed image data SPi. Therefore, the microweave processing unit 144 divides the pixels to an upstream nozzle in the sub-scanning direction by the linefeed adjustment amount ΔRc (that is, K), more than the nozzle divided for the initial feeding quantity Δy, when the feeding quantity adjustment amount ΔRc is plus (ΔRc>0). Further, the microweave processing unit 144 divides the pixels to a downstream nozzle in the sub-scanning direction by the linefeed adjustment amount ΔRc (that is, K), more than the nozzle divided for the initial feeding quantity Δy, when the feeding quantity adjustment amount ΔRc is minus (ΔRc<0). Further, the fixed image data SP (variable image data VP when the variable data VD is image data) composed of M fixed image data SPi generated by the microweave process is sequentially transmitted to the print data generating unit 137 from the microweave processing unit 144.

Meanwhile, the command generating unit 136 generates print commands including a main scan command, a linefeed insertion command, a transport command or the like, to print an image based on the image data ID and the variable data VD in the printer 11. For example, when the feeding quantity is adjusted, the command generating unit 136 generates a linefeed command (sub-scan command) by designating the feeding quantity ΔR after adjustment.

Further, the print data generating unit 137 further divides the M fixed image data SP1 to SPM for each of the recording heads 33A and 33B (that is, each group). M fixed image data SPAi (i=1, . . . , M) for the master side controller 41 and M fixed image data SPBi (i=1, . . . , M) for the slave side controller 42 are generated by the division.

The print data generating unit 137 generates print data PD1 by applying a header including a print command to the fixed image data SPA composed of the M fixed image data SPAi and generates print data PD2 by applying a header including a print command to the fixed image data SPB composed of the M fixed image data SPBi. Further, the print data generating unit 137 also adds the feeding quantity adjustment amount ΔRc when the feeding quantity is adjusted (S4) and the image process-related information including the upper margin ΔM to the headers of the print data PD1 and PD2. Further, the print data generating unit 137 applies a compression process to the print data PD1 and PD2, the variable data VD, and the variable data information AD, separately for the master and the slave, and then transmits the compressed data to the controllers 41 and 42 of the printer 11 through the transmission control unit 127.

The variable data VD determined as image data by the data type determining unit 131 is transmitted to the image processing unit 126 and undergoes the resolution changing process, color changing process, halftone process, and microweave process by the units 141 to 144, similar to the fixed data SD. The generated M variable data VPi (i=1, . . . , M) is matched in position to the passes corresponding to the M fixed image data SP1 to SPM.

Next, the process performed by the printer 11 is described with reference to FIG. 11. In the printer 11, the master side controller 41 receives print data PD1, variable data VD, and variable data information AD and the slave side controller 42 receives print data PD2, variable data VD, and variable data information AD. As described above, the master side controller 41 receives the print data PD1 including the fixed image data SPA used in eight recording heads 33A pertaining to the first group and the slave side controller 42 receives the print data PD2 including the fixed image data SPB used in seven recording heads 33B pertaining to the second group. The fixed image data SPA and a print command are included in the print data PD1 while the fixed image data SPB and a print command are included in the print data PD2. Further, image process-related information (ΔRC (when feeding quantity adjustment is performed), ΔM) is included in the headers of the print data PD1 and PD2. Further, the printer 11 receives whether the variable data is variable data VD implemented by code data or variable image data VP that has undergone an image process in the host side.

The processes of both controllers 41 and 42 in the printer 11 are basically the same, such that the print data PD1 and PD2 is referred to as print data PD without specifically discriminating the data, and the fixed image data SPA and SPB is referred to fixed image data SP without specifically discriminating the data in the following description. Further, the processes in the printer side shown in FIG. 11 are performed by the CPUs 51 in the controllers 41 and 42.

In step S11, the fixed image data SP is received and stored in the intermediate buffer 82. That is, the decompression processing unit 71 decompresses the print data PD and stores the fixed image data SP included in the print data in the intermediate buffer 82.

In step S12, it is determined whether the variable data is code data. The data type determining unit 74 makes the determination. When the variable data is code data, the process proceeds to step S13, and when the variable data is not code data (that is, the variable data is variable image data), the process proceeds to step S14.

In step S13, image conversion of converting the variable data VD implemented by code data into image data (formation data) is performed. The image conversion is performed by the image changing unit 75. The image changing unit 75 generates the variable image data VI by outputting font data (formation data) corresponding to a character code, for example, when the character code is input. Further, when a one-dimensional code or a two-dimensional code is designated as the character code conversion destination, the image changing unit 75 generates variable image data VI by converting a number string or a character string which is written by character codes into an image (code image) of the designated one-dimensional code or of the two-dimensional code.

Further, any one of a method of sending the variable image data VI for each frame to the next process and a method of sending the entire image data with the variable image data VI disposed at a position corresponding to the frames, respectively, to the next process may be employed. The entire image data is generated by disposing the variable image data VI at the positions based on the variable data information AD. Further, when the variable image data VI is sent for each frame, variable data information AD specifying the positions is also sent to the next process.

In step S14, the variable image data VP is stored in the intermediate buffer 82.

A halftone process is applied to the variable image data VI in step S15. The process is performed by the halftone processing unit 76. The variable image data VI is the entire image data with a plurality of variable images arranged in the frames. The halftone processing unit 76 acquires an upper margin ΔM included as image process-related information in the print data PD from the command analyzing unit 72 and adds dummy data of the number of rows corresponding to the upper margin ΔM to an upstream position in the sub-scanning direction (inverse linefeed direction) of the variable image data VI. Further, a halftone process is applied to the variable image data VI added with the dummy data. Meanwhile, when there is the same number of variable image data VI for each frame, as the number of frames, correction of position coordinates which acquires the positions on the image coordinate system of the variable image data VI on the basis of the variable data information AD while applying the halftone process to the variable image data VI, and shifts the Y-coordinate values at the positions as much as the upper margin ΔM in the linefeed direction, is performed. The M variable image data generated for the frames, respectively, by the halftone process is sent to the next process together with position coordinate data.

A microweave process is applied to the variable image data VI after the halftone process in step S16. First, the microweave processing unit 77 divides the variable image data VI into M variable image data VPi (where i=1, 2, . . . , M) by applying a pass division process to the variable image data VI after the halftone process. Further, the microweave processing unit 77 further performs nozzle division sequentially dividing the pixels one by one (one pass) to nozzles for the M variable image data VPi. In this operation, when nozzle division is performed on the variable image data VPi for each pass, nozzle division is performed by deviating the nozzles as much as the feeding quantity adjustment amount ΔRc, on the pass right after linefeed insertion with the feeding quantity adjusted. That is, the microweave processing unit 77 divides the pixels to an upstream nozzle in the sub-scanning direction by the feeding quantity adjustment amount ΔRc (K in the example), more than the nozzle divided for the initial feeding quantity Δy, when the feeding quantity adjustment amount ΔRc is plus. Further, the microweave processing unit 77 divides the pixels to a downstream nozzle in the sub-scanning direction by the feeding quantity adjustment amount ΔRc (K is the example), more than the nozzle divided for the initial feeding quantity ΔRo, when the feeding quantity adjustment amount ΔRc is minus.

On the other hand, in a method of individually processing the variable image data VI for each frame, the halftone processing unit 76 applies a pass division process to the variable image data VI for each frame after the halftone process acquired from the halftone processing unit 76, with reference to the position coordinates. In this operation, when the upper margin is adjusted, the position coordinates where correction for the upper margin ΔM is added are referred.

Further, the pixels of the M variable image data generated by the pass division process are divided to the nozzles. In this operation, when the feeding quantity is adjusted, nozzle division is performed by deviating the nozzles as much as the feeding quantity adjustment amount ΔRc for the pass right after the linefeed with the feeding quantity adjusted. Further, the microweave processing unit 77 sends the M variable image data to the compounding unit 78, together with the position coordinates after the previous correction. The position adjustment for the upper margin ΔM is performed by the halftone process or position adjustment for the feeding quantity adjustment amount ΔRc is performed with the nozzle division of the microweave process, such that the variable image data VP acquired after the microweave process is matched in position with the fixed image data SP. Further, in the method of dealing with variable image data for each frame, the position coordinates of the variable image data is matched in position with the fixed image data SP.

In step S17, a combining process of combining fixed data with variable data is performed. In detail, the compounding unit 78 generates M composite image data BPi (i=1, 2, . . . , M) by combining M fixed image data SPi (i=1, 2, . . . , M) and M variable image data VPi (i=1, 2, . . . , M) to corresponding passes, respectively. The image combining in the operation is performed such that the pixels (color) of a variable image have priority in the region of a variable image in one example. Meanwhile, in the method of dealing with variable image data for each frame, when the variable image data VPi for each frame is combined to each pass, for the fixed image data SPi, the variable image data VPi is combined at positions specified by the position coordinates (correction position coordinates when upper margin is adjusted).

In step S18, a crisscross conversion process or turn process is applied to M composite image data BPi. That is, the crisscross conversion processing unit or turning unit 79 generates head control data for M passes by converting the alignment sequence (reading order) of the pixels of the composite image data BPi from the transverse direction (row direction) to the longitudinal direction (column direction), in accordance with the ejection order of ink droplets from the recording heads 33A (33B).

In step S19, the head control data is transmitted to the recording head. For example, for the master side controller 41, the first head controller 85 divides the head control data into a portion corresponding to the recording head 33A in the first column and a portion corresponding to the recording head 33A in the second column, and further distributes and transmits the head control data of the portion corresponding to the first column to four recording heads 33A in the first column through the HCUs 45. Further, the second head controller 86 further distributes and transmits the head control data of the portion corresponding to the second column to four recording heads 33A in the second column through the HCUs 45.

For example, the j-th linefeed insertion (j=one of 2, . . . , M) is performed for linefeed insertion simulation with the initial feeding quantity Δy, as shown in FIG. 7, the variable data VD straddles the M/S boundary line BL. In this case, only the feeding quantity adjustment amount ΔRc shown in FIG. 8 is adjusted and it is changed to the feeding quantity ΔR where all of the variable data VD do not straddle the M/S boundary line BL. The feeding quantity adjustment amount ΔRc is shown by a value of a natural number times of the nozzle pitch Δn. (ΔRc=K·Δn (where K is a natural number)). Further, the feeding quantity ΔR is acquired by adding ΔRc to Δy in the adjustment of increasing the feeding quantity (ΔR=Δy+ΔRc) and acquired by subtracting ΔR from Δy in the adjustment of decreasing the feeding quantity. For example, when the initial feeding quantity Δy is ¼ of the nozzle pitch Δn, the value, which is acquired by adding or subtracting the feeding quantity adjustment amount ΔRc (=K·Δn (where K is a natural number)) shown by a value of natural number times of the nozzle pitch Δn in accordance with an increase or a decrease in feeding quantity to or from the feeding quantity Δy is the feeding quantity ΔR.

Therefore, the master side controller 41 and the slave side controller 42 do not divisionally print one variable data VD.

For example, when one variable data VD is divisionally printed between the controllers 41 and 42, print deviation easily occurs at a position corresponding to the M/S boundary line BL in the variable image. In order to avoid this type of print deviation, it is preferable to matching the data by frequently exchanging information through the communication line SL4, such as checking the boundary of the variable image, between the controllers 41 and 42. However, in this case, since the load in the communication process increases and the communication speed through the communication line SL4 is relatively low, the other processes in the print control are easily delayed. For example, a standby time where the starting of the recording unit 30 is generated between the passes during printing. Further, in order to reduce the standby time, when the number of times of communication for adjusting the ejection timing is unnecessarily decreased, the ejection timings for controlling the recording heads 33A and 33B in the same column are different even in the same column between the controllers 41 and 42, such that print deviation occurs at the position of the M/S boundary line BL in the variable image. Further, in order to suppress the print deviation as much as possible, it is also necessary to add complicated control for attenuating the print deviation to the controllers 41 and 42.

However, according to the embodiment, as adjustment is performed such that the variable data VD does not straddle the M/S boundary line BL, it is not necessary to add frequent communication between the controllers 41 and 42 or complicated control for suppressing the print deviation as much as possible.

As described above, according to the embodiment, it is possible to achieve the following effects.

(1) A plurality of recording heads disposed in the recording unit 30 are divided into two groups in the sub-scanning direction, the eight recording heads 33A at the upstream side in the sub-scanning direction which pertain to one group are controlled by the master side controller 41 and the seven recording heads 33B at the downstream side in the sub-scanning direction which pertain to the other group are controlled by the slave side controller 42. Therefore, the M/S boundary line BL becomes one piece, such that it is possible to reduce the frequency of the variable data VD straddling the M/S boundary line BL. Further, when there is a linefeed where the variable data VD straddles the M/S boundary line BL in the linefeed insertion simulation, all of the variable data VD are adjusted to the feeding quantity ΔR so that the variable data does not straddle the M/S boundary line BL. Accordingly, it is possible to reduce the frequency that the recording heads 33A and 33B, which are individually controlled by the controllers 41 and 42, divisionally print a variable image based on one variable data VD. Therefore, it is possible to avoid print deviation, where a joint is shown at the position corresponding to the M/S boundary line BL in the variable image.

Meanwhile, in order to prevent the joint described above from being generated in the variable image, for example, when the variable data VD straddles the M/S boundary line BL, pass division/error diffusion data process results are exchanged between the controllers 41 and 42. Further, for example, in the error diffusion process (or dither process) in the halftone process, it is possible to match with the last data of the master side controller 41 by processing the front of the snip with the slave side controller 42 while using the last process result of the variable data VD of the portion that the master side controller 41 is in charge of. As a result, it is possible to prevent deterioration of the print quality, such as that the line of the joint in the variable image is shown when printing has been performed. However, in this case, as the image process data is exchanged every time between the controllers 41 and 42, printing is very slowed due to the serial communication having a relatively slow communication speed through the communication line SL4 between the controllers 41 and 42. According to the embodiment, however, since it is possible to reduce the frequency of the variable data VD straddling the M/S boundary line BL, it is possible to considerably suppress the frequency of print delay due to the slow communication speed, even if the configuration of exchanging the process result data between the controllers 41 and 42 when the variable data VD straddles the M/S boundary line BL.

(2) Since the feeding quantity is adjusted such that all of the variable data VD do not straddle the M/S boundary line BL, it is possible to perform efficient printing. For example, when the variable data VD straddles the M/S boundary line BL, it is possible to reduce the load of checking the match of the division lines when dividing the variable data VD at the M/S boundary line BL, or the load of communication performed through the communication line SL4 to synchronizing the ejection timings, between the controllers 41 and 42. Further, it is possible to reduce or remove the frequency of remaining control for suppressing the print deviation at a position of the M/S boundary line BL as much as possible in the controllers 41 and 42.

(3) Since the feeding quantity is adjusted, the print position of the image on the sheet 13 is not changed in the sub-scanning direction Y. Therefore, it is possible to avoid defects due to the variable data VD straddling the M/S boundary line BL while printing an image at a desired position on the sheet 13.

(4) When it is difficult to cope with the defect by adjusting only the feeding quantity, the upper margin can also adjusted such that the variable data VD does not straddle the M/S boundary line BL. As a result, although the image is printed apart from the desired print position on the sheet 13 as much as the adjustment amount of the upper margin, it is possible to avoid defects due to the variable data VD straddling the M/S boundary line BL.

(5) Adjustment of the feeding quantity is performed prior to adjustment of the upper margin. Accordingly, it is possible to print the image as near as possible at the desired print position on the sheet 13 while avoiding or preventing the variable data VD from straddling the M/S boundary line BL. In particular, when it is determined that it is difficult to cope with the defect by only adjusting the feeding quantity, the insufficiency in the adjustment of the feeding quantity is compensated by adjusting the upper margin, such that it is possible to suppress the deviation amount from the desired print position on the sheet 13 as much as possible by adjusting the upper margin.

(6) The compounding unit 78 is disposed in the printer 11 and the process of combining the fixed image with the variable image is performed in the printer 11 in one example. In this case, the controllers 41 and 42 cut the corresponding portions from the fixed image data and the variable image data at the M/S boundary line BL and individually combine the data of the different cut portion (some of the fixed image data with some of the variable image data). In this operation, when a process is performed with the variable data VD straddling the M/S boundary line BL, it is necessary to perform communication for matching the cut lines (division lines) and the composite positions, or remaining process/control for suppressing the print deviation in the variable image as much as possible, between the controllers 41 and 42. However, since the variable data VD is adjusted so that it does not straddle the M/S boundary line BL in the embodiment, it is possible to print a composite image with small deviation in the variable image while suppressing an increase of the frequency of communication or an increase in the load in processing, which cause print throughput to deteriorate.

(7) Since the printer 11 includes the image changing unit 75, the halftone processing unit 76, the microweave processing unit 77, and the compounding unit 78, when the variable data VD is code data, it is possible to transmit the variable data as variable data to the printer 11 from the printer driver 122 and convert the code data into image data by using the image changing unit 75 in the printer 11. Further, the variable image data VI generated by the image changing unit 75 is adjusted for the upper margin ΔM in the halftone processing unit 76 in the printer 11 and adjusted for the linefeed adjustment amount ΔRc in the microweave processing unit 77. Further, the variable image data VD generated with the adjustment and the fixed image data SP received from the host device 120 are combined in the compounding unit 78 in the printer 11. Accordingly, since the image process and the combining process are applied to the variable image data VI after the image conversion, communication for transporting to the host device 120 is not necessary. Further, since the printer driver 122 is not necessary to perform the image conversion or the combining process of the variable data VD, it is possible to reduce the load in processing of the printer driver 122.

(8) For image data in which the variable data VD does not necessarily use the image changing unit 75 of the printer 11, the image data is transmitted to the printer 11 after the feeding quantity is adjusted or an image process reflecting the upper margin adjustment is performed in the printer driver 122. Accordingly, the image process of the variable data VD in the printer 11 may be unnecessary, such that it is possible to reduce the processing load in the printer 11.

(9) In the printer 11, the fixed image data SP received for the first printing from the host device 120 is stored in the intermediate buffer 82 and the fixed image data SP in the intermediate buffer 82 is used in the printing after the second printing, such that it is possible to reduce the processing load in the printer driver 122. Further, in the printing after the second printing, since the data amount to be transmitted is as small as the unnecessary amount of the fixed image data SP does not need to be transmitted, it is easy to suppress deterioration of print throughput due to a complication in communication, for example.

(10) Since the independent control body of the recording heads 33A and 33B in the recording unit 30 is divided into the first head control unit 85 and the second head control unit 86 for each column in the recording head, it may possible to control the recording head control units 85 and 86 at one ejection timing. Therefore, it is possible to avoid complications in control which is a problem when a configuration in which one head control unit controls recording heads in a plurality of columns.

(11) Since the image changing unit 75 can generate a one-dimensional code or two-dimensional code, it is possible to print an image of a one-dimensional code or two-dimensional code without limiting the variable image to fonts, such as characters, symbols, and numbers. Accordingly, it is easy to avoid misanalysis of a one-dimensional code or a two-dimensional code, which is printed as a variable image. In particular, the two-dimensional code is an aggregate of fine cells, such that it causes misanalysis or errors even with small print deviation, but it is possible to suppress misanalysis (e.g., misalignment) even in the two-dimensional code.

The embodiment described above may be modified into the following ways.

Figure 12:
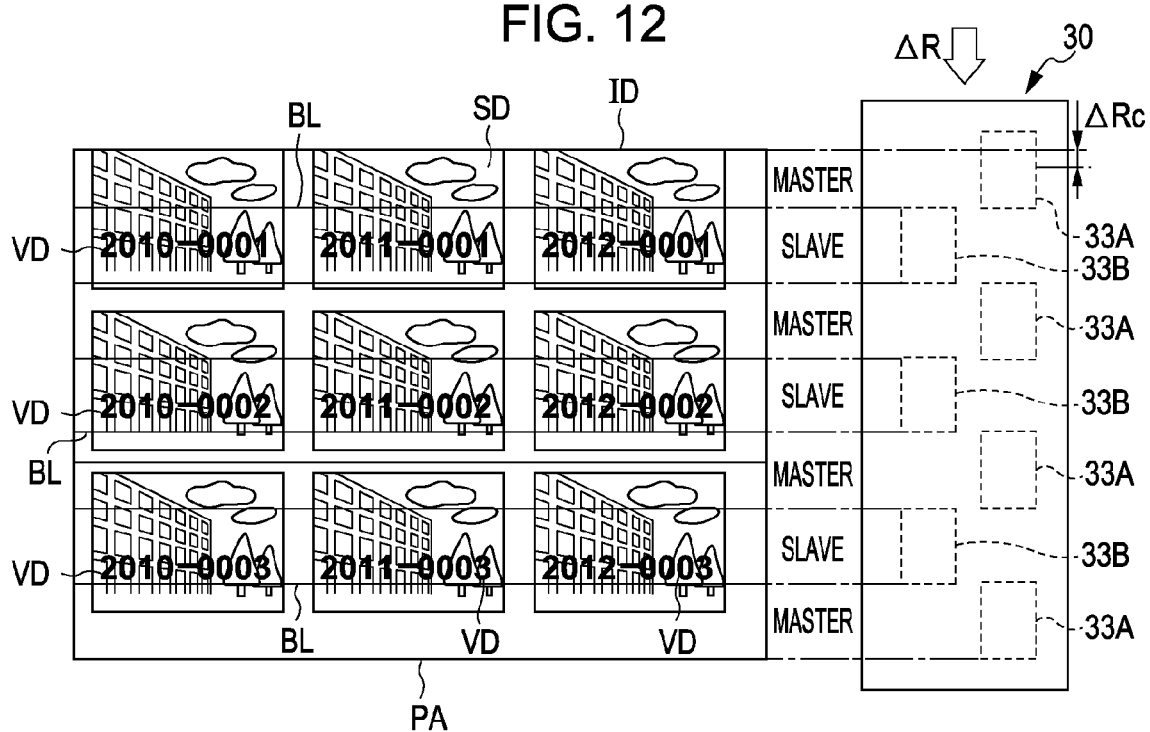
FIG. 12 is an example of a schematic view when the feeding quantity is adjusted in a recording unit of a modified example.
Figure 13:
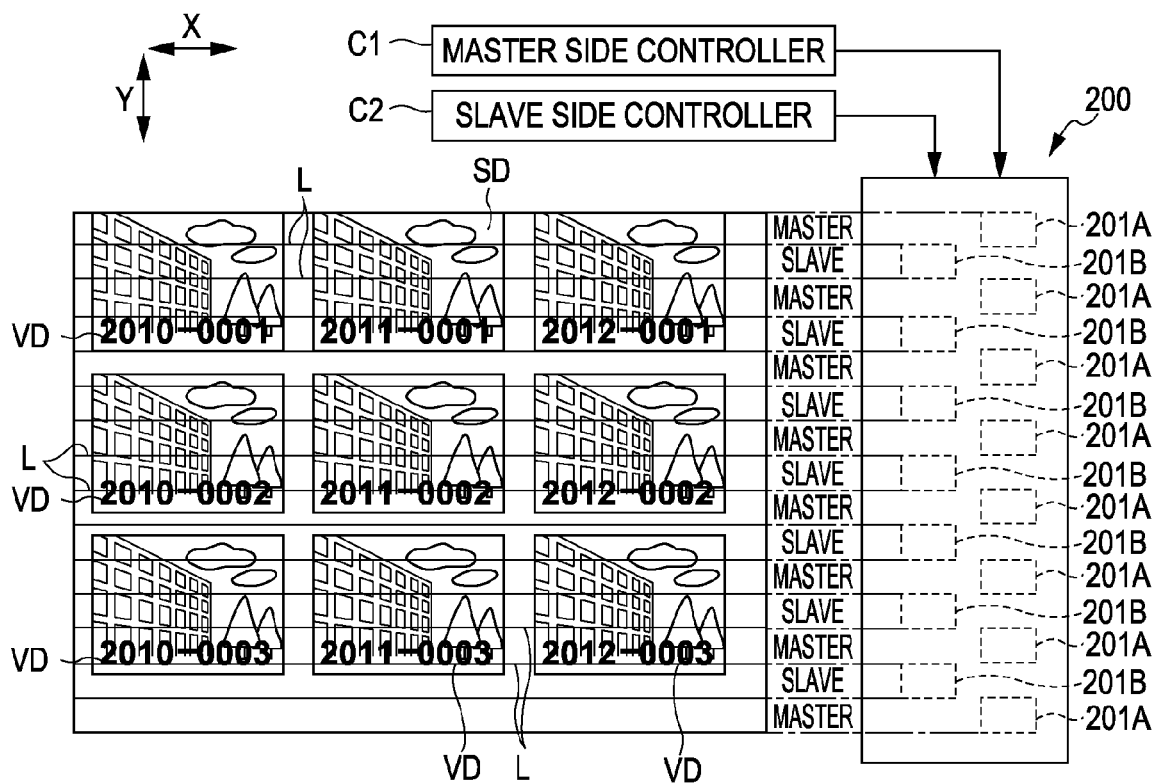
FIG. 13 is an example of a schematic view when variable data straddles an M/S boundary line in the related art.

The method of dividing a plurality of recording heads 33 into a plurality of groups is not limited to the method of dividing the recording heads in the sub-scanning direction Y. For example, as shown in FIG. 12, it may be possible to divide recording head in two columns disposed in the recording unit 30 into two groups (a group for each column) in the main scanning direction (left-right direction in the figure). That is, the recording heads are divided into two groups of a plurality of (for example, four) recording heads 33A in the first column (the right column in the figure) and a plurality of (for example, three) recording heads 33B in the second column (left column in the figure). In this configuration, similar to the related art (FIG. 13), the number of M/S boundary lines BL increases, but it is possible to avoid defects, such as an increase in load of processing due to the variable data VD straddling the M/S boundary line BL or delay of the process, by changing the feeding quantity to the feeding quantity ΔR (Δy+ΔRc) where the variable data VD does not straddle the M/S boundary line BL.

In the embodiment, although the combining process is performed in the printer 11, the combining process may be performed in the printer driver. In this case, for the variable data VD implemented by code data, the code data may be converted into image data in the printer driver 122.

The image process of the fixed data may be performed by the printer by switching from the printer driver. That is, the functions of the printer driver 122 (the first determining unit 132, the second determining unit 133, the margin calculating unit 134, the feeding quantity calculating unit 135, and the like) are disposed in the printer 11. Further, the printer 11 performs the process shown in FIG. 10 and the process shown in FIG. 11 on the basis of the image data ID and the variable data information AD which are received from the image generating device 110 or the host device 120 through the serial communication ports U3 and U4 (data acquiring unit).

When the variable data VD is image data, the printer 11 may perform the image process.

Although a plurality of (P) recording heads are divided in half into two groups (of eight and seven), the number of recording heads in the divided groups may be the same in all the groups, if at least one recording head is included in one group. For example, in the embodiment, combinations of one and fourteen recording heads or two and thirteen recording heads may be possible. The recording heads can also be divided into two groups in the sub-scanning direction. In this configuration, it is possible to make the M/S boundary line BL (boundary) into one piece. That is, when P recording heads are divided into the same number of groups as N that is the number of controllers in the sub-scanning direction, a division method that can divide the M/S boundary line BL (boundary of recording regions) into at least N−1 pieces may be possible.

Two recording heads may be possible. In this case, two controllers 41 and 42 control the recording heads, respectively. As described above, the number N of controllers and the number P of recording heads may be the same (N=P). However, it is preferable that the number N (≥2) of controllers be smaller than the number P of recording heads (N<P). For N<P, the frequency of controlling the variable data such that the variable data does not straddle the M/S boundary line BL (boundary of recording regions) increases, as compared with when P recording heads are controlled by the same number P (N=P) of controllers.

In the embodiment, although the feeding quantity and the upper margin are both adjusted, when it is determined that adjustment is impossible only with the feeding quantity ΔR, only the upper margin may be adjusted. Further, the adjustment when the variable data VD straddles the M/S boundary line BL may be only the adjustment of the feeding quantity. It is possible to avoid printing where the variable data straddles the M/S boundary line BL, by this configuration.

The adjustment of a margin is not limited to the upper margin ΔM (upper margin amount). Adjustment of margin (margin amount) that moves back the recording position (nozzle position) of an image based on the fixed data and the variable data in the second direction with respect to the group of recording heads may be possible. For example, it may be possible to adjust a lower margin ΔM (lower margin amount) in the embodiment.

Although two controllers are provided in the embodiment, the printer may be provided with three or more controllers. That is, the number N of controllers provided in the printer is preferably the same as or less than the number P of recording heads (recorders) (N≤P). In this case, the recording heads disposed in the recording unit are divided into the same number of groups as the controllers and the groups are controlled by different controllers. The method of dividing the recording heads disposed in the recording unit preferably divides the recording heads into the same number of groups as the controllers in the sub-scanning direction such that the number of M/S boundary lines BL can be reduced as much as possible.

One recording head may be possible. It may be possible to divide nozzle columns of the same ink which are formed in one recording head into a plurality of nozzle groups and control the nozzle groups with different controllers. In this case, one nozzle group corresponds to one recorder.

Although the printer driver 122 applies up to the microweave process to the fixed data, it may apply only up to the halftone process and transmit the fixed data. In this case, in the printer 11, up to the halftone process is applied to the variable data VD with the process order of which the compounding unit 78 and the microweave processing unit 77 are changed, and then the compounding unit 78 combines the variable data after the halftone process with the fixed data after the halftone process. Further, the microweave processing unit 77 performs the microweave process to the composite image data. That is, when the composite image data is pass-divided into M pieces and the data is nozzle-divided for each pass after the composite, nozzle division is performed by deviating the nozzles as much as the feeding quantity adjustment amount ΔRc in the sub-scanning direction, for the pass with the feeding quantity adjusted.

When microweave printing is not performed, but band printing is performed, the variable data VD may be adjusted so that it does not straddle the boundary of recording regions of the recording heads controlled by different controllers.

The recording apparatus is not limited to the lateral scan type printer 11 and may be a serial printer. Further, the printer is not limited to an ink jet type and may be applied to a dot impact type printer. That is, recording apparatuses that perform printing while inserting linefeeds may be used.

Although the ink jet type printer 11 is employed as the recording apparatus in the embodiment, a liquid ejection apparatus that ejects or discharges liquid other than ink may be employed. Further, the invention may be used for various liquid ejection apparatus equipped with a liquid ejection head discharging a small amount of liquid droplets. In this case, the droplets means the state of liquid discharged from the liquid ejecting apparatus, including a particle shape, a tear shape, and a string shape with a tail. Further, the liquid may be a material that the liquid ejecting apparatus can eject. For example, the material may be in a liquid state, including liquid with high or low viscosity, a fluid substance, such as sol, gel water, other inorganic solvent, organic solvent, solution, liquid-state resin, liquid metal (metallic melt), including not only liquid as one state of the material, but a substance where particles of a functional material made of solid materials, such as colorant or metal particles are solved, dispersed, or mixed in a solvent. Further, the ink or the liquid crystal described in the embodiment may be a typical example of the liquid. The ink includes various liquid combines, such as common aqueous ink, oil-based ink, gel ink, and hot-melt ink. A liquid ejecting apparatus that diffuses an electrode material or color material or ejects liquid including the materials as a solution, which are used for manufacturing, for example, a liquid crystal display, an EL (electroluminescence) display, a surface-emitting display, and a color filter, may be exemplified as a detailed example of the liquid ejecting apparatus. Further, a liquid ejecting apparatus that ejects a bio-organic material used for manufacturing a biochip, a liquid ejecting apparatus that ejects liquid that is a sample used as a precise pipette, and a printing apparatus, or a microdispenser may be possible. Further, a liquid ejecting apparatus that ejects a lubricant with a pin point to a precise machine, such as a watch or a camera, a liquid ejection apparatus that ejects transparent resin liquid, such as ultraviolet-curable resin, on to a substrate in order to form a small semispherical lens (optical lens) used for an optic communication element, and a liquid ejecting apparatus that ejects etching liquid, such as acid or alkali, in order to etch a substrate or the like may be employed. Further, the invention may be applied to any one of the liquid ejecting apparatuses. Further, the fluid may be powders, such as toner. Further, the fluid described herein does not include substances composed of only gases.

The technical spirit understood from the embodiment and the modified examples is described below with the effects.

(1) In the recording apparatus, N is two, P is three or more, and the two controllers control two groups of three or more recorders divided in the second direction, which is described in claim 3. According to an embodiment of the invention, since there is one boundary of recording regions controlled by different control units, it is possible to further increase frequency of controlling a variable image based on variable data so that the variable data does not straddle the boundary, in comparison to a recording apparatus including the same number of control units and recording units (N=P).

What is claimed is:

1. A recording apparatus of a lateral scanning type, comprising:
a recording unit that includes P (P is a natural number of 2 or more) recorders that perform recording on a recording medium based on image data, wherein the P recorders include a first recorder and a second recorder, the first recorder and the second recorder controlled by different controllers;
a scanning unit that allows the recording unit to scan in a first direction in order to perform the recording of the recorder on the recording medium;
a feeding unit that feeds the recording unit in a second direction crossing the first direction;
a data acquiring unit that acquires the image data, wherein the image data includes fixed data and variable data; and
a control unit that includes N (N is a natural number of P or less) controllers controlling the P recorders and controls a feeding quantity of the feeding unit such that a variable image based on the variable data is recorded inside a boundary of a first recording region and does not straddle the boundary of the first recording region, that is the recording region of the first recorder, and a boundary of a second recording region, that is the recording region of the second recorder, wherein the control unit controls the feeding quantity by inserting linefeeds to adjust a position of the recording unit in the second direction such that the variable image, when recorded by the recording unit, does not straddle the boundary of the first recording region and the second recording region.

2. The recording apparatus according to claim 1,
wherein the recording unit performs M-time (M is a natural number of 2 or more) scannings and recordings of one-time lateral scanning by M−1-time feedings which is performed alternately with the scanning, and
at least the feeding quantity is adjusted when the variable image straddles the boundary, when a feed having a specified feeding quantity is inserted among the M−1-time feedings.

3. The recording apparatus according to claim 1,
wherein the N controllers control one or more recorders pertaining to a group corresponding to the P recorders which are divided into N groups in the second direction crossing the first direction, respectively.

4. The recording apparatus according to claim 1,
wherein the control unit includes a first determining unit that determines whether the variable image straddles the boundary and a second determining unit that determines whether the feeding quantity that prevents the variable image from straddling the boundary is adjustable when the first determining unit determines that the variable image straddles the boundary, and
the control unit performs adjustment of the feeding quantity when the second determining unit determines that the adjustment is possible, and performs an image process, which deviates a recording position of an image based on the fixed data and the variable data in the second direction to a position where the variable image based on the variable data does not straddle the boundary, on the fixed data and the variable data when the second determining unit determines that the adjustment is not possible.

5. The recording apparatus according to claim 4,
wherein the control unit adjusts the feeding quantity and performs the image process on the fixed data and the variable data, when the second determining unit determines that the feeding quantity is not adjustable.

6. The recording apparatus according to claim 1,
wherein the control unit includes:
a first determining unit that determines whether the variable image straddles the boundary;
a calculating unit that calculates a feeding quantity that is adjustable such that a variable image based on the variable data does not straddle the boundary when it is determined that the boundary is straddled;
a first adjusting unit that performs adjustment according to the adjust amount of the feeding quantity on the fixed data;
a second adjusting unit that performs adjustment according to the adjustment amount of the feeding quantity on the variable data; and
a combining unit that combines the fixed data after the adjustment with the variable data after the adjustment, and
the control unit controls the feeding unit to feed with the feeding quantity calculated by the calculating unit.

7. The recording apparatus according to claim 6,
wherein the first adjusting unit includes a storing unit that stores fixed data after the adjustment which is adjusted for a first recording,
in recording after a second recording, the second adjusting unit performs adjustment according to the adjustment amount of the feeding quantity on variable data acquired by the data acquiring unit for recording after the second recording, and
the combining unit combines fixed data after the adjustment which is stored in the storing unit with variable data after adjustment by the second adjusting unit.

8. The recording apparatus according to claim 6,
wherein the recording apparatus is a recording system including a printer driver disposed in a host device and a printer that communicates with the host device,
the variable data is code data,
the printer driver includes the data acquiring unit, the determining unit, the calculating unit, and the first adjusting unit, and
the printer includes a receiving unit that receives the variable data before adjustment and fixed data after the adjustment from the host device, a converting unit that converts the variable data from code data into image data, a second adjusting unit that performs adjustment according to the adjustment amount of the feeding quantity on a variable data after being converted into image data, and the combining unit.

9. A recording method using a recording apparatus of a lateral scanning type that comprises a recording unit that includes P (P is a natural number of 2 or more) recorders that perform recording on a recording medium, wherein the P recorders include a first recorder and a second recorder, the first recorder and the second recorder controlled by different controller, a control unit that includes N (N is a natural number of P or less) controllers, the recording method comprising:
scanning the recording unit in a first direction in order to perform the recording of the recorder on the recording medium based on image data;
feeding the recording unit in a second direction crossing the first direction;
acquiring the image data, wherein the image data includes fixed data and variable data; and
controlling the P recorders and controlling a feeding quantity of the feeding unit such that a variable image based on the variable data is recorded inside a boundary of a first recording region and does not straddle a boundary of the first recording region, that is the recording region of the first recorder, and a second recording region, that is the recording region of the second recorder, in the second direction,
wherein the feeding quantity is controlled by inserting linefeeds to adjust a position of the recording unit in the second direction such that the variable image, when recorded by the recording unit, does not straddle the boundary of the first recording region and the second recording region.

* * * * *